(12) United States Patent
Hill et al.

(10) Patent No.: US 9,833,777 B2
(45) Date of Patent: Dec. 5, 2017

(54) WATER OXIDATION CATALYSTS AND METHODS OF USE THEREOF

(71) Applicant: EMORY UNIVERSITY, Atlanta, GA (US)

(72) Inventors: Craig L. Hill, Atlanta, GA (US); Yurii V. Gueletii, Decatur, GA (US); Djamaladdin G. Musaev, Atlanta, GA (US); Qiushi Yin, Tucker, GA (US); Bogdan Botar, Juelich (DE)

(73) Assignee: Emory University, Atlanta, GA (US)

( * ) Notice: Subject to any disclaimer, the term of this patent is extended or adjusted under 35 U.S.C. 154(b) by 300 days.

(21) Appl. No.: 14/338,384

(22) Filed: Jul. 23, 2014

(65) Prior Publication Data

US 2017/0106359 A1      Apr. 20, 2017

Related U.S. Application Data

(63) Continuation of application No. 13/256,227, filed as application No. PCT/US2010/027670 on Mar. 17, 2010, now Pat. No. 8,822,367.

(Continued)

(51) Int. Cl.
  *B01J 35/00*   (2006.01)
  *B01J 23/00*   (2006.01)
(Continued)

(52) U.S. Cl.
  CPC ........... *B01J 35/004* (2013.01); *B01J 23/002* (2013.01); *B01J 23/6527* (2013.01);
(Continued)

(58) Field of Classification Search
None
See application file for complete search history.

(56) References Cited

U.S. PATENT DOCUMENTS

| 8,822,367 B2 | 9/2014 | Hill |
| 2005/0112055 A1 | 5/2005 | Shannon |
| 2010/0143811 A1 | 6/2010 | Brimblecombe |

OTHER PUBLICATIONS

Gao, Shuiying, Electrochemical Behavior and Multilayer films of the Sandwich-type Polyoxotungstate Complex {K10Co4(H2O)2(PW9O34)2}, Materials Letters vol. 60, 3622-3626 (2006).*

(Continued)

*Primary Examiner* — Melissa Swain
(74) *Attorney, Agent, or Firm* — Emory Patent Group

(57) ABSTRACT

Homogeneous water oxidation catalysts (WOCs) for the oxidation of water to produce hydrogen ions and oxygen, and methods of making and using thereof are described herein. In a preferred embodiment, the WOC is a polyoxometalate WOC which is hydrolytically stable, oxidatively stable, and thermally stable. The WOC oxidized waters in the presence of an oxidant. The oxidant can be generated photochemically, using light, such as sunlight, or electrochemically using a positively biased electrode. The hydrogen ions are subsequently reduced to form hydrogen gas, for example, using a hydrogen evolution catalyst (HEC). The hydrogen gas can be used as a fuel in combustion reactions and/or in hydrogen fuel cells. The catalysts described herein exhibit higher turn over numbers, faster turn over frequencies, and/or higher oxygen yields than prior art catalysts.

5 Claims, 9 Drawing Sheets

Related U.S. Application Data

(60) Provisional application No. 61/160,881, filed on Mar. 17, 2009, provisional application No. 61/305,301, filed on Feb. 17, 2010.

(51) Int. Cl.

| | | |
|---|---|---|
| *B01J 23/652* | (2006.01) | |
| *B01J 27/188* | (2006.01) | |
| *C01B 3/04* | (2006.01) | |
| *C01B 13/02* | (2006.01) | |
| *C01G 51/00* | (2006.01) | |
| *C01G 55/00* | (2006.01) | |
| *H01M 8/0606* | (2016.01) | |
| *B01J 23/888* | (2006.01) | |
| B01J 27/199 | (2006.01) | |

(52) U.S. Cl.
CPC ........... *B01J 23/888* (2013.01); *B01J 27/188* (2013.01); *B01J 35/0033* (2013.01); *C01B 3/042* (2013.01); *C01B 13/0207* (2013.01); *C01G 51/006* (2013.01); *C01G 55/002* (2013.01); *H01M 8/0606* (2013.01); B01J 27/199 (2013.01); B01J 2523/00 (2013.01); C01P 2002/82 (2013.01); C01P 2002/84 (2013.01); C01P 2002/86 (2013.01); C01P 2002/88 (2013.01); C01P 2006/40 (2013.01); Y02E 60/364 (2013.01); Y02E 60/50 (2013.01)

(56) References Cited

OTHER PUBLICATIONS

Sartorel, Andrea, Polyoxometalate Embedding of a Tetraruthenium (IV)-oxo-core by Template-Directed Metalation of [gamma-SiW10O36]: A Totally Inorganic Oxygen-Evolving Catalyst, J. Am. Chem. Soc., vol. 130, p. 5006-5007 (Mar. 2008).*

Sala, Xavier, Molecular Catalysts that Oxidize Water to Dioxygen, Angew. Chem. Int. Ed, vol. 48, 2842-2852 (Jan. 2009).*

Besson, Claire, et al., Cs9[gamma-PW10O36)2Ru4O5(OH)(H2O)4], a new all-inorganic, soluble catalyst for the efficient visible-light-driven oxidation of water, Cehm. Comun., Feb. 2010, 46, 2794-2786.*

Besson et al., Cs9[(c-PW10O36)2Ru4O5(Oh)(H20)4], a new all-inorganic, soluble catalyst for the efficient visible-light-driven oxidation of water, Chem. Commun., 2010, 46, 2784-2786, Feb. 2010.

Brimblecombe et al. Sustained Water Oxidation Photocatalysis by a Bioinspired Manganese Cluster Angew. Chem. Int. Ed. 2008, 47, 7335-7338, Aug. 2008.

Brimblecombe et al., Electrochemical investigation of Mn4O4-cubane water-oxidizing clusters Phys. Chem. Chem. Phys., 2009, 11, 6441-6449, May 2009.

Brimblecombe et al. Sustained Water Oxidation by [Mn4O4]7ρ Core Complexes Inspired by Oxygenic Photosynthesis Inorg. Chem. 2009, 48, 7269-7279, Jul. 2009.

Gao et al. Electrochemical behavior and multilayer films of the sandwich-type polyoxotungstate complex {K10Co4 (H20h(PW 9O34)2}, Materials Letters, 2006, 60:3622-3626 D6, Apr. 2006.

Geletii et al., An All-Inorganic, Stable, and Highly Active Tetraruthenium Homogeneous Catalyst for Water Oxidation Angrew. Chem. Int Ed. 2008, 47, 3896-3899 D1, Mar. 2008.

Geletii et al., Homogeneous Light-Driven Water Oxidation Catalyzed by a Tetraruthenium Complex with All Inorganic Ligands J. Am. Chem. Soc. 2009, 131, 7522-7523, May 2009.

Huang et al. Efficient Light-Driven Carbon-Free Cobalt-Based Molecular Catalyst for Water Oxidation, J. Am. Chem. Soc. 2011, 133, 2068-2071, Jan. 2011.

Kanan, In Situ Formation of an Oxygen-Evolving Catalyst in Neutral Water Containing Phosphate and Co2+, Science, 2008 vol. 321:1072-1075. D5, Aug. 2008.

Natali et al. Is [Co4(H2O)2(a-PW9O34)2]10-a genuine molecular catalyst in photochemical water oxidation? Answers from time-resolved hole scavenging experiments, Chem. Commun., 2012, 48, 8808-8810, Jul. 2012.

Sala et al. Molecular Catalysts that Oxidize Water to Dioxygen, Angew. Chem. Int, Ed. 2009, 48, 2842- 2852 D3, Jan. 2009.

Sartorel et al., Polyoxometalate Embedding of a Tetraruthenium(IV)-oxo-core by Template-Directed Metalation of [y-SiW1003s]8: A Totally Inorganic Oxygen-Evolving Catalyst, J. Am. Chem. Soc. 2008, 130, 5006-5007 D2, Mar. 2008.

Stracke et al. Electrocatalytic Water Oxidation Beginning with the Cobalt Polyoxometalate [Co4(H2O)2(PW9O34)2] 10-: Identification of Heterogeneous CoOx as the Dominant Catalyst, J. Am. Chem. Soc. 2011, 133, 14872-14875, Oct. 2011.

Stracke et al. Water Oxidation Catalysis Beginning with Co4(H2O)2(PW9O34)210- When Driven by the Chemical Dxidant Ruthenium(III)tris(2,2'- bipyridine): Stoichiometry, Kinetic, and Mechanistic Studies en Route to Identifying the True Catalyst, ACS Catal. 2014, 4, 79-89, Dec. 2013.

Stracke et al. water Oxidation Catalysis Beginning with 2.5 µM [Co4(H2O)2(PW9O34)2]10-: Investigation of the True Electrochemically Driven Catalyst at ≥600 mV Overpotential at a Glassy Carbon Electrode, ACS Catal., 2013, 3 (6), pp. 1209-1219, May 2013.

Vickers et al. Differentiating Homogeneous and Heterogeneous Water Oxidation Catalysis: Confirmation that [Co4 (H2O)2(α-PW9O34)2]10- Is a Molecular Water Oxidation Catalyst, J. Am. Chem. Soc. 2013, 135, 14110-14118, Aug. 2013.

Weakley, 18-Tungstotetracobalto(11)diphosphate and Related Anions: a Novel Structural Class of Heteropolyanions, J.C.S. Chem. Comm., 1973, 139-140, Jan. 1973.

Yin et al., A Fast Soluble Carbon-Free Molecular Water Oxidation Catalyst Based on Abundant Metals Science 328, 342 (2010), Apr. 2010.

* cited by examiner

WATER OXIDATION CATALYSTS AND METHODS OF USE THEREOF

CROSS REFERENCE TO RELATED APPLICATIONS

This Application is a continuation of U.S. application Ser. No. 13/256,227, filed Sep. 13, 2011, now U.S. Pat. No. 8,822,367, issued Sep. 2, 2014, which is a 371 U.S.C of PCT International Patent Serial No. PCT/US2010/027670, filed on Mar. 17, 2010, which claims the benefit of priority to U.S. Provisional Application 61/160,881, filed on Mar. 17, 2009 and U.S. Provisional Application 61/305,301, filed on Feb. 17, 2010. The entirety of each of these applications is incorporated by reference for all purposes.

STATEMENT REGARDING FEDERALLY SPONSORED RESEARCH

This invention was made with Government Support under Grant No. DE-FG02-03ER-15461 awarded by the Department of Energy. The Government has certain rights in the invention.

FIELD OF THE INVENTION

This invention is in the field of stable catalysts for the oxidation of water, particularly homogeneous polyoxometalate water oxidation catalysts.

BACKGROUND OF THE INVENTION

Producing renewable clean energy is one of the most profound challenges of the 21$^{st}$ century. Most of the world's current energy supplies come from sunlight converted to chemical energy by plant photosynthesis. Photosynthesis begins with light striking a light harvesting complex in Photosystem II, creating a charge-separated excited state where an electron is promoted to a higher energy level. Water oxidation catalyzed by an oxygen evolving complex (OEC) replenishes the hole derived from the charge-separated excited state. This process causes the release of four equivalents of H$^+$ per water molecule. Some of the generated protons are used in a proton gradient, which the plant employs to store energy by synthesizing ATP. The high energy electrons move along an electron transport chain and are eventually used to reduce the remaining protons from the water oxidation process.

A central thrust of current energy research focuses on artificial photosynthesis, namely synthetic light-harvesting, water-based fuel producing systems. Despite the intense global efforts to develop viable a biological water splitting systems for energy production, breakthroughs are needed in selectivity, speed, and stability of the three operational units in the catalyst system: the sensitizer for light absorption, the catalyst for water reduction, and the catalyst for water oxidation.

Developing a synthetic viable water oxidation catalyst (WOC) has proven particularly challenging. An effective WOC must be fast, capable of water oxidation at a potential minimally above the thermodynamic value (H$_2$O→O$_2$+4H+ +4e−; 1.23 V), and, stable to air, water and heat (i.e., oxidative, hydrolytic, and thermal stability). Both heterogeneous and homogeneous WOCs have been investigated. Heterogeneous WOCs generally have the advantages of low cost, ease of interface with electrode systems, and oxidative stability, but they are harder to study and thus are harder to optimize compared to homogeneous catalysts. Further, heterogeneous catalysts can be deactivated by surface poisoning or aggregation.

In contrast, homogeneous WOCs are more amenable to spectroscopic, crystallographic, physiochemical, and computational investigation, and thus can be readily optimized. Additionally, each individual molecule of a homogeneous catalyst is capable of doing chemistry, a cost issue when precious metals such as Ruthenium are involved. However, many of the known homogeneous catalysts that have been investigated contain organic ligands that are thermodynamically unstable with respect to oxidative degradation. As a result, all homogenous WOCs with organic ligands reported to date are oxidatively deactivated.

There exists a need for WOCs that have the stability, durability, and accessibility of heterogeneous metal oxide catalysts with the activity, selectivity and tunability of homogeneous catalysts.

Therefore, it is an object of the invention to provide hydrolytically, oxidatively, and thermally stable WOCs for the rapid oxidation of water and methods of making and using thereof.

It is a further object of the invention to provide WOCs prepared from inexpensive and abundant metals.

It is still further an object of the invention to provide stable WOCs prepared from inexpensive and abundant metals that exhibit improved turn over number, turn over frequency, and/or oxygen yield.

SUMMARY OF THE INVENTION

Water oxidation catalysts (WOCs) for the oxidation of water to produce hydrogen ions and oxygen, and methods of making and using thereof are described herein. In one embodiment, water is reacted with a homogeneous WOC to produce hydrogen ions and oxygen. Oxygen yield can be monitored using a variety of techniques known in the art. In one embodiment, oxygen yield is monitored using gas chromatography ("GC") by withdrawing gas samples from the reaction vessel headspace. The hydrogen ions can be subsequently reduced to form hydrogen gas, for example, using a hydrogen evolution catalyst (HEC). The catalysts described herein exhibit higher turn over numbers, faster turn over frequencies, and/or higher oxygen yields than prior art catalysts.

In a preferred embodiment, the homogeneous WOC is hydrolytically stable. In a more preferred embodiment, the WOC is hydrolytically stable and oxidatively stable. In an even more preferred embodiment, the WOC is hydrolytically stable, oxidatively stable, and thermally stable. In one embodiment, the WOC is free of carbon-based ligands. In a particular embodiment, the WOC is a polyoxometalate WOC that is hydrolytically stable, oxidatively stable, and thermally stable. In a preferred embodiment, the WOC is prepared from inexpensive and abundant metals, such as cobalt.

The net reaction of the oxidation of water is as follows:

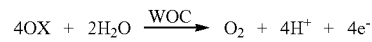

where OX is an oxidant or an oxidizing electrode. An oxidant is a sacrificial electron accepting molecule. An oxidizing electrode is a positively biased electrode.

The reaction between the WOC and water can be conducted in the dark (i.e., absent irradiation of the catalyst)

using an oxidant, such as [Ru(bpy)$_3$]$^{3+}$, or an oxidizing electrode. Alternatively, the reaction can be conducted in the presence of one or more external stimuli, such as light, in order to generate the oxidant. A preferred stimulus is sunlight. In embodiments where an external stimulus is used to generate the oxidant, light is used to excite [Ru(bpy)$_3$]$^{2+}$ to a higher energy state. A readily available and inexpensive oxidant, such as persulfate, traps the excited state [Ru(bpy)$_3$]$^{2+}$ and oxidizes it to [Ru(bpy)$_3$]$^{3+}$, which subsequently oxidizes water in the presence of the WOC to form oxygen and hydrogen ions.

In one embodiment, the WOC self-assembles under turnover conditions. Self-assembly allows for self-repair of the catalyst which improves the turn over number and oxygen yield in the catalyzed reactions. "Self-assembly", as used herein refers to processes in which a disordered system of pre-existing components, e.g., reagents in solution, forms an organized structure as a consequence of specific, local interactions among the components themselves, without external direction.

The WOCs and methods of use thereof described herein can be used to generate hydrogen fuel from the oxidation of water. The hydrogen ions produced in the oxidation of water can be reduced to form hydrogen gas, for example, using a hydrogen evolution catalyst. The resulting hydrogen gas can be used as a fuel in combustion reactions and/or in hydrogen fuel cells. A product of hydrogen combustion and hydrogen consumption in fuel cells is water, which can be recycled and reoxidized by the water oxidation catalyst.

DETAILED DESCRIPTION OF THE INVENTION

I. Definitions

Figure 1:
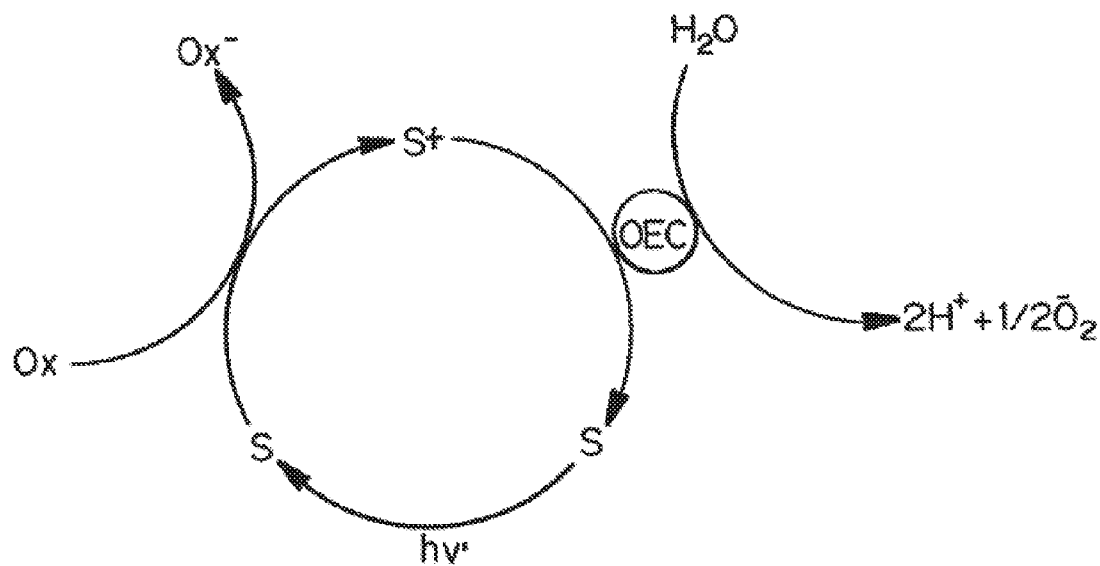
FIG. 1 is a schematic for the oxidation of water. S is a dye, Ox is a sacrificial oxidant, and OEC is a water oxidation catalyst.

"Water oxidation catalyst", "WOC", "oxygen evolving catalyst", and "OEC" are used interchangeably and refer to a catalyst used to oxidize water to form oxygen (O$_2$) and hydrogen ions.

"Homogeneous", as used herein, means the catalyst is soluble in the reaction solution.

"Polyoxometalate" or "POM", as used herein, generally refers to a polyatomic ion, usually an anion, which includes three or more, preferably four or more, more preferably five or more, most preferably six or more, transition metal oxyanions linked or shared by oxygen atoms.

"Inorganic ligand", as used herein, means a ligand which does not contain carbon atoms.

"Transition metal", as used herein, generally refers to metals in Groups 1B-8B of the Periodic Table.

"Non-Metal", as used herein, generally refers to the elements to the right of the separation between metals and non-metals in the Periodic Table. In general, non-metals have low to moderate conductivity and higher electronegativity compared to metals. Exemplary non-metals include, but are not limited to, phosphorous (P), nitrogen (N), and Sulfur (S).

"Metalloid" and "semiconductor" are used interchangeably and refer to solid elements having moderate electrical conductivity. Examples include, but are not limited to, silicon, boron, and aluminum.

"Oxidatively stable", as used herein, means that more than 90%, more than 92%, more than 94%, more than 95%, more than 98%, more than 99%, more than 99.5%, more than 99.9%, more than 99.95%, more than 99.99% of the catalyst molecules are structurally intact in the presence of one or more oxidants including, but not limited to, O$_2$, O$_3$, and peroxides, over a broad pH range (e.g., 3-9) for at least 7 days, 14 days, 21, days, 28 days, 30 days, 45 days, two months, three months, four months, five months, six months, one year, or longer at ambient temperature and ambient light conditions. Alternatively, the catalyst undergoes less than 10%, less than 5%, less than 1%, less than 0.5%, less than 0.1%, less than 0.05%, or less than 0.01% oxidation under the conditions described above. In a particular embodiment, the catalyst undergoes no structural changes under the conditions described above.

"Hydrolytically stable", as used herein, means that more than 90%, more than 92%, more than 94%, more than 95%, more than 98%, more than 99%, more than 99.5%, more than 99.9%, more than 99.95%, more than 99.99% of the catalyst molecules are structurally intact in the presence of water over a broad pH range (e.g., 3-9) for at least 7 days, 14 days, 21, days, 28 days, 30 days, 45 days, two months, three months, four months, five months, six months, one year, or longer at ambient temperature and ambient light conditions. Alternatively, the catalyst undergoes less than 10%, less than 5%, less than 1%, less than 0.5%, less than 0.1%, less than 0.05%, or less than 0.01% hydrolysis under the conditions described above. In a particular embodiment, the catalyst undergoes no structural changes under the conditions described above.

"Thermally stable", as used herein, means that more than 90%, more than 92%, more than 94%, more than 95%, more than 98%, more than 99%, more than 99.5%, more than 99.9%, more than 99.95%, more than 99.99% of the catalyst molecules are structurally intact at room temperature or lower or when heated to a temperature above room temperature. In a particular embodiment, the catalyst undergoes no structural changes when heated above room temperature.

"Turn over number" or "TON", as used herein, means the number of moles of substrate that a mole of catalyst can convert before being inactivated. TON is calculated as the number of moles of oxygen, $n_{O2}$, divided by the number of moles of catalyst, ncat.

"Turn over frequency" or "TOF", as used herein, refers to the turnover per unit time under turnover conditions. It is typically expressed in $s^{-1}$. The TOF can be calculated by dividing the TON by the time period, in seconds, over which the TON was measured.

"Turnover conditions", as used herein, refers to the conditions in which the catalytic reaction takes place. "Turnover conditions" include at a minimum pH and temperature. Other criteria include concentration of the oxidant and concentration of the WOC. The turnover conditions can vary for a given WOC.

"Oxygen yield", as used herein, refers to the percent oxygen formed during the catalytic reaction. It is express as a percent by weight of an oxidant or sacrificial electron acceptor.

"Oxidant" or "sacrificial electron acceptor", as used herein, refers to the molecule that is reduced during the oxidation of water.

"Light collecting molecule", as used herein, refers to the molecule in the catalytic system that absorbs light creating a charge separated excited state.

"Hydrogen reduction catalyst" and "hydrogen evolving catalyst" are used interchangeable and refer to a catalyst which reduce protons to form hydrogen gas.

"Supramolecular", as used herein, means consisting of more than one molecule.

"Nanostructure" or "nanomaterial", as used herein, generally refers to a structure or material having dimensions between molecular and micrometer sized structures. In one embodiment, the structures have dimensions typically less than about 1000 nm.

II. Water Oxidation Catalysts (WOCs)

WOCs for the oxidation of water to form hydrogen ions and oxygen ($O_2$) and methods of use thereof are described herein. Oxygen yield can be monitored using a variety of techniques. In one embodiment, oxygen yield is monitored using gas chromatography ("GC") by withdrawing gas samples from the reaction vessel headspace. The procedure for calibrating the GC and analyzing the sample is described in the examples.

In a preferred embodiment, the WOC is hydrolytically stable. In a more preferred embodiment, the WOC is hydrolytically stable and oxidatively stable. In an even more preferred embodiment, the WOC is hydrolytically stable, oxidatively stable, and thermally stable. For example, solutions of the catalysts described herein show no change after several months in storage at ambient temperature and ambient light when analyzed by UV/Vis-spectroscopy and/or cyclic voltammetry.

Moreover, the WOC remains intact during the catalytic reaction. This was confirmed by analyzing a post-reaction solution of the catalyst using $^{31}P$ Nuclear Magnetic Resonance (NMR) for those catalysts containing phosphorous as discussed below. In another embodiment, the catalysts described herein are stable under catalytic turnover conditions for at least one week, two weeks, three week, four weeks, one month, 45 days, two months, three months, or longer as determined by UV/Vis spectroscopy, cyclic voltammetry, and/or $^{31}P$ NMR. Suitable turnover conditions include pH in the range from about 3 to about 9, preferably from about 4 to about 9, more preferably from about 5 to about 9, and most preferably from about 5 to about 8. In a preferred embodiment, the pH is about 5-6 or about 8-9. The turn over conditions may vary depending on the chemical composition of the catalyst.

The reaction may be conducted in the presence of a sacrificial electron accepting molecule. Suitable sacrificial molecules include, but are not limited to, ($[Ru(bpy)_3]^{3+}$ and persulfate. In one embodiment, the sacrificial oxidant is tris(2,2'-bipyridyl)triperchlororuthenium (III) ($[Ru(bpy)_3]^{3+}$). The reaction for the oxidation of water in the presence of $[Ru(bpy)_3]^{3+}$ and water oxidation catalyst is shown below:

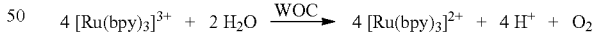

$$4\,[Ru(bpy)_3]^{3+} + 2\,H_2O \xrightarrow{WOC} 4\,[Ru(bpy)_3]^{2+} + 4\,H^+ + O_2$$

A schematic showing the catalytic reaction is shown in FIG. 1. A photosensitizing complex S (dye), such as [Ru(bpy)$_3$]$^{2+}$, absorbs light and transforms into a charge separated excited state S*. The excited state is quenched, for example by persulfate, to form $[Ru(bpy)_3]^{3+}$, the oxidized form of the dye (S$^+$). S$^+$ oxidizes water in the presence of the water oxidation catalyst. The dye is then converted back to its original form and a new catalytic cycle begins.

The quantum efficiency for generating the oxidant (e.g., $[Ru(bpy)_3]^{3+}$) can be a limiting factor in the catalytic reaction. The overall quantum efficiency may be improved by better schemes for generating $[Ru(bpy)_3]^{3+}$. Specifically, systems can be used to prolong the lifetime of the oxidant in solution. For example, $[Ru(bpy)_3]^{2+}$-sensitized nanocrystalline $TiO_2$ has been shown to achieve near unity quantum efficiency in generating long-lived photooxidants. Other materials and/or techniques known in the art may be used to increase the quantum efficiency for generating [Ru(bpy)$_3$]$^{3+}$.

The oxidation of water can be catalyzed by WOC in the presence of additional additives, such as bpy, and salts, such as NaCl and KCl.

In one embodiment, the TON is at least about 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 500, 1000, 5000 or greater over a period of one minute, two minutes, three minutes, four minutes, five minutes, or greater. In a particular embodiment, the TON is from about 200 to about 5000 over a period of one minute, two minutes, three minutes, four minutes, five minutes, or greater.

The TOF is at least about 0.1 s$^{-1}$, at least about 0.3 s$^{-1}$, at least about 0.5 s$^{-1}$, at least about 1 s$^{-1}$, at least about 1.5 s$^{-1}$, at least about 2 s$^{-1}$, at least about 3 s$^{-1}$, at least about 5 s$^{-1}$, at least about 7 s$^{-1}$, at least about 8 s$^{-1}$, and at least about 10 s$^{-1}$. Alternatively, the TOF is from 0.1 s$^{-1}$ to about 10 s$^{-1}$, preferably from about 1 s$^{-1}$ to about 10 s$^{-1}$, preferably from about 1 s$^{-1}$ to about 6 s$^{-1}$, more preferably from about 2 s$^{-1}$ to about 6 s$^{-1}$, most preferably from about 3 s$^{-1}$ to about 6 s$^{-1}$. In one embodiment, the TON was about 1000 in under about 3 minutes for a TOF of greater than 5 s$^{-1}$.

In still another embodiment, the percent oxygen generated is at least about 25%, 30%, 35%, 40%, 45%, 50%, 55%, 60%, 65%, 70% or greater based on the net oxidant (sacrificial electron acceptor). In a preferred embodiment, the percent oxygen generated is greater than 70% based on the next oxidant.

The TON, TOF, and/or oxygen yield can vary as a function of the catalyst concentration, sacrificial electron accepting molecule concentration, pH, and combination thereof. In one embodiment, the concentration of the catalyst is from about 0.1 µM to about 20 µM, preferably from about 0.1 µM to about 10 µM, more preferably from about 0.1 µM to about 5 µM, most preferably from about 1 µM to about 3 µM. In another embodiment, the pH of the reaction is from about 3 to about 9, preferably from about 5 to about 9, more preferably from about 5 to about 8.

The hydrogen ions that are produced in the reaction can be reduced to form hydrogen gas, which can be used as a fuel in combustion reactions and/or in hydrogen fuel cells. Hydrogen ions can be reduced to hydrogen gas using techniques well known in the art, for example, through the use of hydrogen evolution catalysts (HECs).

A. Polyoxometalate Catalysts

In one embodiment, the WOC is a polyoxometalate (POM) catalyst or blend of POM catalysts. POMs are composed primarily of M-O-M bonds, wherein M is a metal in a high oxidation state (e.g., d$^0$ or d$^1$ configuration). POMs are typically negatively charged ions, and thus their solubility varies depending on the nature of the counterion with which they are paired. For example, most POMs are isolated as alkali metal salts that are soluble in water. POMs are strongly resistant to oxidation due to their d$^0$ configuration. This is a major advantage that POMs have over other compounds that contain organic moieties as it improves the stability of POM species under conditions that are too oxidatively harsh for organic structures. POMs can be tuned by varying different structural elements, such as M and/or the ligands bound to the core.

Suitable POM catalysts include catalysts having the formula:

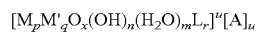

wherein

M is the skeletal POM metals, typically a d$^0$ center, such as tungsten (W$^{VI}$), molybdenum (Mo$^{VI}$), vanadium (V$^V$), niobium (Nb$^V$), tantalum (Ta$^V$), or combinations thereof, M' is one or more redox active metals selected from f-block elements, d-block elements, or combinations thereof;

p is an integer from 0 to 200;
q is an integer from 1 to 40;
x is an integer from 0 to 450;
n is an integer from 0 to 50;
m is an integer from 0 to 50;
L is an inorganic ligand;
r is an integer from 2 to 5;
u is a negative integer less than or equal to −1;
A is a cation or combination of cations such that the sum of the positive charges of the cations balances that negative charge, u, on the polyanion.

In one embodiment, M is tungsten (W$^{VI}$), molybdenum (Mo$^{VI}$), vanadium (V$^V$), or combinations thereof. In a preferred embodiment, M is tungsten (W$^{VI}$). In one embodiment, p is an integer from 0-50, 0-25, 0-20, 0-15, or 0-10. In another embodiment, p is an integer from 1-50, 1-25, 1-20, 1-15, or 1-10.

In one embodiment, M' is a transition metal. Suitable transition metals include, but are not limited to, titanium, chromium, manganese, cobalt, iron, nickel, copper, rhodium, silver, iridium, palladium, platinum, mercury, ruthenium, vanadium, an f-block metal, and combinations thereof. Suitable f-block metals are cerium and europium. In one embodiment, M' is a metal having a range of oxidation states. In a preferred embodiment, M' is cobalt or ruthenium. In one embodiment, q is an integer from 1-30, 1-25, 1-20, 1-15, 1-10, or 1-5.

In one embodiment, x is an integer from 1-100, 1-50, 1-25, 1-20, 1-15, 1-10, or 1-5 and n and m are independently integers from 1-50, 1-25, 1-20, 1-10, or 105.

In one embodiment, L has the formula $X_aY_bO_c$, wherein X is a non-metal or metalloid; Y is a transition metal; a and b are integers from 0 to 20; and c is an integer from 1 to 100. In one embodiment, X is a non-metal including, but not limited to, phosphorous. In another embodiment, X is a metalloid including, but not limited to, silicon, boron, and aluminum. In one embodiment, Y is a transition metal including, but not limited to, cobalt, zinc, tungsten, vanadium, molybdenum, niobium, and iron. In a preferred embodiment, X is silicon or phosphorus, Y is tungsten, vanadium, or molybdenum, a=1, b=9 or 10, and c is 34 or 36.

Suitable counterions, A, include, but are not limited to, quaternary ammonium cations, protons, alkali metal cations, alkaline earth metal cations, d-block cations, f-block cations, or combinations thereof. In one embodiment, u is an integer from 3-50.

In one embodiment, the polyoxometalate catalyst is not [{Ru$_4$O$_4$(OH)$_2$(H$_2$O)$_4$}(γ-SiW$_{10}$O$_{36}$)$_2$]$^{10-}$.

1. Cobalt-Based Catalysts

In one embodiment, the POM catalyst is a cobalt-based catalyst, wherein cobalt is the redox metal. In a preferred embodiment, the POM catalyst contains a Co$_4$O$_4$ core stabilized by oxidatively and hydrolytically stable ligands, such as polytungstate ligands, polyvanadate ligands, and/or polymolybdenate ligands. Cobalt is an inexpensive and abundant metal, unlike ruthenium, which lowers the cost of manufacturing cobalt-containing catalysts.

In a particular embodiment, the POM catalyst is [Co$_4$(H$_2$O)$_2$(PW$_9$O$_{34}$)$_2$]$^{10-}$ [Co$_4$(H$_2$O)$_2$(PW$_9$O$_{34}$)$_2$]$^{10-}$ is a self-assembling catalyst; the catalyst assembles in situ, for example, by heating $WO_4^{2-}$, $Co^{2+}$, and $HPO_4^{2-}$ in the proper stoichiometric ratios in aqueous medium at pH 7. Other catalysts will self-assemble under different reactions conditions. Such catalysts are self-repairing by self-assembling into the proper configuration for catalytic activity under turnover conditions.

$[Co_4(H_2O)_2(PW_9O_{34})_2]^{10-}$ can be used in the form of a variety of salts, such as the $K_{10}$ salt. Using $[Ru(bpy)_3]^{3+}$ as the oxidant, catalytic turnover frequencies for $O_2$ production $\geq 5\ s^{-1}$ at pH=8 were observed. The rate of water oxidation of $[Co_4(H_2O)_2(PW_9O_{34})_2]^{10-}$ is sensitive to pH. Increasing pH from 7.5 to 8 decreased the reaction time from 270 seconds to 90 seconds (pH after the reaction was 7.3 and 7.5, respectively). The reaction was even faster in a solution with a high buffer capacity, such as a mixture of 30 mM sodium phosphate (NaPi) and 30 mM sodium borate buffer having a final pH of >7.9. At concentrations of $1.2 \times 10^{-4}$ mM $[Co_4(H_2O)_2(PW_9O_{34})_2]^{10-}$ and 2.4 mM $[Ru(bpy)_3]^{3+}$, a turn over number (TON) of ~$10^3$ was observed in under three minutes. Such speeds are dramatically faster than the analogous ruthenium-containing catalysts.

As discussed below, spectroscopic, electrochemical, and inhibition studies showed that $[Co_4(H_2O)_2(PW_9O_{34})_2]^{10-}$ is stable under catalytic turnover conditions since neither hydrated cobalt ions nor cobalt hydroxide/oxide particles form in situ. Specifically, no changes were observed in either the UV/Vis spectrum or the $^{31}P$ NMR spectrum of a solution of $[Co_4(H_2O)_2(PW_9O_{34})_2]^{10-}$ at pH=8 over a one month period. UV/Vis spectroscopy or the $^{31}P$ nuclear magnetic resonance also showed that $[Co_4(H_2O)_2(PW_9O_{34})_2]^{10-}$ is stable for at least one month within the pH range of 3.5 to 9.

Selective catalyst poisoning experiments using 2,2'-bipyridine ("bpy") as an inhibitor were conducted. Bpy reacts with $Co^{2+}$ (aq) to form $[Co(bpy)_3]^{2+}$ inhibiting all water oxidation activity. Aging $Co(NO_3)_2$ under reaction conditions for three days significantly decreased the catalytic activity of $Co(NO_3)_2$. In contrast, the addition of the same molar excess of bpy to solutions of $[Co_4(H_2O)_2(PW_9O_{34})_2]^{10-}$ had little effect on the catalytic activity of the anion. Similarly, aging $[Co_4(H_2O)_2(PW_9O_{34})_2]^{10-}$ under the same reaction conditions for three days has no effect on its catalytic activity.

The stability of $[Co_4(H_2O)_2(PW_9O_{34})_2]^{10-}$ Was also evaluated by assaying a post-reaction solution containing $[Co_4(H_2O)_2(PW_9O_{34})_2]^{10-}$ using $^{31}P$ NMR. In the $^{31}P$ NMR spectrum of the solution, $[Co_4(H_2O)_2(PW_9O_{34})_2]^{10-}$ (1850 ppm, $\Delta_{v1/2}$=600 Hz) was the only species detected besides the free phosphate originating from the buffer solution, indicating that $[Co_4(H_2O)_2(PW_9O_{34})_2]^{10-}$ remains intact under catalytic water oxidation conditions.

Characterization of the catalyst by infrared (IR) spectroscopy after an initial catalytic run showed the $[Co_4(H_2O)_2(PW_9O_{34})_2]^{10-}$ at 1037 cm-1, 939 $cm^{-1}$, 882 $cm^{-1}$, and 767 $cm^{-1}$, indicating that the POM framework remains intact after catalysis. Cyclic voltammetry was used to show that the catalytic activity of the active species is retained after turnover in contrast to $Co(NO_3)_2$. Again, this finding is consistent with aqueous cobalt ion hydrolyzing and condensing to hydroxide/oxide particles under oxidative conditions, decreasing the effective catalyst concentration. Cyclic voltammetry of 1 mM of $[Co_4(H_2O)_2(PW_9O_{34})_2]^{10-}$ showed a large catalytic current with low overpotential for water oxidation.

Computational studies of the electronic structure of $[Co_4(H_2O)_2(PW_9O_{34})_2]^{10-}$ also indicate the oxidative stability of the polytungstate ligands. The four top HOMO's of a high-spin ground state $[Co_4(H_2O)_2(PW_9O_{34})_2]^{10-}$ are mostly cobalt core orbitals, and there is almost no involvement of tungstate orbitals. These findings indicate that the polytungstate ligands are unlikely to participate in the water oxidation reaction and should be effectively inert under catalytic conditions. Therefore, d-electron transition metal oxide clusters stabilized by robust polydentate POM ligands are a potent class of self-assembling inorganic complexes capable of catalyzing fast water oxidation in a homogeneous medium.

2. Ruthenium-Based Catalysts

In one embodiment, the POM catalyst is a ruthenium-containing catalyst. In a preferred embodiment, the POM catalyst contains a $Ru_4O_4$ or $Ru_4O_5$ core stabilized by oxidatively and hydrolytically stable ligands, such as polytungstate ligands.

In one embodiment, the ruthenium-based POM catalyst is $[(\gamma\text{-}SiW_{10}O_{36})_2Ru_4O_4\ (OH)_2(H_2O)_4]^{10-}$. In a particular embodiment, the catalyst is the salt $Rb_8K_2[(\gamma\text{-}SiW_{10}O_{36})_2 Ru_4O_4\ (OH)_2(H_2O)_4]$. $[(\gamma\text{-}SiW_{10}O_{36})_2Ru_4O_4\ (OH)_2(H_2O)_4]^{10-}$ is stable over a wide range of pH values. The anion exhibits several reversible one-electron redox couples by cyclic voltammetry and catalyzes both the electro-oxidation and chemical oxidation of water in aqueous solutions at low overpotentials. The polytungstate ligands stabilize the $Ru_4O_6$ core over several oxidation states needed for catalytic water oxidation and are oxidatively, hydrolytically, and thermally stable. Micromolar concentrations of $Rb_8K_2[(\gamma\text{-}SiW_{10}O_{36})_2Ru_4O_4\ (OH)_2(H_2O)_4]$ catalyzed the reaction of $[Ru(bpy)_3]^{3+}$ and water. Dioxygen was produced in yield of up to 75% based on $[Ru(bpy)_3]^{3+}$ and water was confirmed as the source of oxygen using $^{18}O$-labeled water. TON varied from 30-92. The equivalent molar quantity of $RuCl_3$, a precursor of known water oxidation catalyst $RuO_2$ was far less catalytically active than $Rb_8K_2[(\gamma\text{-}SiW_{10}O_{36})_2Ru_4O_4 (OH)_2(H_2O)_4]^{10-}$ with a oxygen yield of less than 11%.

Visible light-driven water oxidation catalyzed by $[(\gamma\text{-}SiW_{10}O_{36})_2Ru_4O_4\ (OH)_2(H_2O)_4]^{10-}$ in the presence of a sacrificial electron acceptor, such as persulfate, was also observed. The quantum efficiency (defined as the number of molecules of $O_2$ formed per two absorbed photons) was approximately 9%, which is among the highest reported for photocatalytic water oxidation using molecular catalysts. $[Ru(bpy)_3]^{3+}$ is generated from $[Ru(bpy)_3]^{2+}$ by photooxidation using persulfate as a sacrificial electron acceptor. The absorption of two photons and the consumption of two equivalents of persulfate generates four equivalents of $[Ru(bpy)_3]^{3+}$, which oxidizes $[(\gamma\text{-}SiW_{10}O_{36})_2Ru_4O_4\ (OH)_2 (H_2O)_4]^{10-}$, which in turn oxidizes water to oxygen and regenerates $[Ru(bpy)_3]^{3+}$. The oxygen yield, at a catalyst concentration of 5 µM, was approximately 38%. The TON was approximately $1.8 \times 10^2$ with an initial TOF of approximately $8 \times 10^{-2}\ s^{-1}$. Highers TONs (up to approximately $3.5 \times 10^2$) were achieved at lower catalyst concentration and high persulfate concentrations.

$[(\gamma\text{-}SiW_{10}O_{36})_2Ru_4O_4\ (OH)_2(H_2O)_4]^{10-}$ was shown to be stable in solution at natural pH (3-4 depending on concentration) and under catalytic turnover conditions. $[(\gamma\text{-}SiW_{10}O_{36})_2Ru_4O_4\ (OH)_2(H_2O)_4]^{10-}$ was also shown to be hydrolytically stable. Both UV-Vis spectra and cyclic voltammograms show no change in solutions of $Rb_8K_2[(\gamma\text{-}SiW_{10}O_{36})_2Ru_4O_4\ (OH)_2(H_2O)_4]^{10-}$ after several months of storage at ambient temperature and room illumination.

The stability of $[(\gamma\text{-}SiW_{10}O_{36})_2Ru_4O_4(OH)_2(H_2O)_4]^{10-}$ was evaluated post reaction. No particles of $RuO_2$ or other possible decomposition products were observed in post-catalysis solutions as measured by small angle X-ray scattering. Further, no particles <500 nm were observed in these solutions by dynamic light scattering. Voltammetric monitoring of the catalyst in solution after catalysis showed the same enhancement of the catalytic current for the oxidation of $[Ru(bpy)_3]^{2+}$ to $[Ru(bpy)_3]^{3+}$.

In another embodiment, the ruthenium-based POM catalyst is $[(\gamma-PW_{10}O_{36})_2Ru_4O_5(OH)(H_2O)_4]^{9-}$. In a particular embodiment, the catalyst is the salt $Cs_9[(\gamma-PW_{10}O_{36})_2Ru_4O_5(OH)(H_2O)_4]$. While the oxygen atoms linking the $\{PW_{10}O_{37}Ru_2\}$ units are non-protonated (average BVS 1.87), the oxygen atoms bridging the two ruthenium centers within one $\{PW_{10}O_{37}Ru_2\}$ unit display a bond valence sum (BVS) of 1.35 and 1.48, significantly lower than the previous value but still higher than that encountered in the silicon analogue where both bridges are protonated (BVS never exceeds 1.30). Therefore, it is likely that the catalyst exists in a monoprotonated state, with a proton disordered over two positions, in agreement with the nine cesium counterions localized in the density map.

Dioxygen formed rapidly under visible light illumination at pH 5.8 in the presence of $[(\gamma-PW_{10}O_{36})_2Ru_4O_5(OH)(H_2O)_4]^{9-}$ in a $Na_2SiF_6$ buffer. The initial TOF reached 0.13 $s^{-1}$. The TON varied up to a maximum of 120. The oxygen yield, based on persulfate, was approximately 25%.

III. Methods of Use

The catalysts described herein can be used to generate hydrogen ions, which can be reduced to hydrogen gas using techniques well known in the art, for example, through the use of hydrogen evolution catalysts. Suitable hydrogen evolution catalysts include, but are not limited to, tungsten disulfide, molybdenum disulfide, cobalt tetraimines, cyclopentadienyl ruthenium-nickel catalysts, samarium hydroxide, colloidal platinum catalysts stabilized by polyvinyl alcohol, dinuclear iron complexes, which are structural models of the active site of a type of enzyme (iron hydrogenases) which are efficient catalysts for hydrogen evolution, macrocyclic cobalt and nickel complexes, noble metals, and noble metal oxides and sulfides. Other hydrogen evolution catalysts are known in the art.

The WOC catalysts described herein can be used in a variety of devices. In one embodiment, the device is a cell containing an anode and a cathode. Water is oxidized at the anode in the presence of the WOC and hydrogen gas is evolved at the cathode. In some embodiments, the cathode contains a hydrogen evolution catalyst, for example, coated on the cathode surface. The anode and cathode can be made from materials known in the art. Such cells are known in the art and can be designed to conduct the reaction on any scale, including industrial scale. Alternatively, the reaction can be conducted in a cell in which the anode is irradiated with light resulting in the evolution of hydrogen gas.

In still another embodiment, the reaction can be take place in the presence of a supramolecular system, such as a nanomaterial or nanostructure. Such systems can be used to imitate photosynthesis by conducting both water oxidation and proton reduction in the same molecular system. For example, in one embodiment, water is oxidized, in the presence of a WOC, at one end or part of a nanomaterial or nanostructure to produce oxygen, hydrogen ions, and electrons. The electrons are transported rapidly to another part of the nanomaterial or nanostructure, where a water reduction catalyst (hydrogen evolution catalyst) catalyzes the reduction of hydrogen ions by electrons to form hydrogen gas.

Supramolecular systems include molecular assemblies and composite materials. Exemplary materials include inorganic materials, such as high performance semiconducting nanomaterials and hierarchically assembled nanostructures. The materials can be designed to enhance light absorption, for example, by the incorporation of molecular antennae. Inorganic-organic hybrid materials with enhanced light absorption and tunable bandgaps can be used as platforms for the catalysts described herein. Other materials include nanotubes, nanosheets, etc., such as those prepared from $TiO_2$, other inorganic materials, and organic materials. Molecular assemblies can be prepared from polymers and polypeptides. Exemplary structures include polymer and coiled-coil polypeptide assemblies that can precisely position molecular subunits in three dimensions. Light harvesting assemblies prepared from polymers, such as one dimensional polymers, that absorb sunlight and efficiently transport the excited state energy over long distances can also be used. Finally, printing technology can be used to design, fabricate, and test nanostructured metal-oxide electrodes for improved light capture in solar fuel devices.

The hydrogen gas produced in the device described above can be separated from the oxygen gas. The hydrogen gas can be captured and stored until use. Alternatively, the devices described above can be linked to a hydrogen fuel cell or combustion reactor so that the hydrogen gas is fed directly into the end device. The product of hydrogen combustion/hydrogen consumption is water. This water can be recycled and reoxidized using the catalysts and methods of use described herein. Oxygen is also produced in the catalytic reaction. Oxygen can be capture and stored and used for a variety of applications which oxygen production is desirable.

The catalysts described herein can be incorporated into one or more of the devices discussed above or other devices suitable for water oxidation and the devices sold to the end user. Alternatively, the catalysts described herein can be provided in a kit. The kits contains the catalyst in a container, along with instructions for use of the catalyst, and the end user incorporates the catalyst into one of the devices discussed above or another device useful for water oxidation. For industrial scale processes, the amount of catalyst to be used can vary from grams to kilograms to pounds. One of ordinary skill can readily determine the amount of catalyst need for a particular application on a particular scale.

1. Electrochemical Fuel Cells

A fuel cell is generally an electrochemical cell that converts a source fuel into an electrical current and water. It generates electricity inside a cell through reactions between a fuel and an oxidant, triggered in the presence of an electrolyte. The reactants flow into the cell, and the reaction products flow out of it, while the electrolyte remains within it. Fuel cells can operate virtually continuously as long as the necessary flows are maintained.

Fuel cells are different from conventional electrochemical cell batteries in that they consume reactant from an external source, which must be replenished, a system known as a thermodynamically open system A hydrogen fuel cell uses hydrogen as its fuel and oxygen (usually from air) as its oxidant.

Other oxidants, such as chlorine or chlorine dioxide can also be used. Examples of hydrogen fuel cells include, but are not limited to, proton exchange fuel cells, solid oxide fuel cells, and molten carbonate fuel cells.

Applications of hydrogen fuel cells include power sources for automobiles and other vehicles, such as industrial equipment and power sources for remote locations, such as remote weather stations, large parks, rural locations, and in certain military applications. Hydrogen fuel cells can also be used to power small electronic devices where AC charging may not be available for weeks at a time, such as notebook computers, portable charging docks for small electronics (e.g. a belt clip that charges your cell phone or PDA), smartphones, GPS units, and small heating appliances. A fuel cell system running on hydrogen can be compact and lightweight, and have no major moving parts. Because fuel cells have no moving parts and do not involve combustion, they have high reliability, resulting in minimum down time.

2. Hydrogen Combustion

Hydrogen can be combusted in the presence of air to produce energy. For example, hydrogen fuel, purified oxygen, and water can be fed into a combustor. The only product of the reaction is steam, since there no contaminants in the oxygen which can produce pollutants, such as $NO_x$. The resulting steam can be used to power a gas turbine. Disadvantages of such a system include energy loss.

Alternatively, a process known as chemical looping can be used for hydrogen combustion. Chemical looping uses two successive reactions: metal oxide reduction with hydrogen and subsequent oxidation of the metal with pressurized air to yield the metal oxide and a high temperature flue gas. The resulting flue gases can be used to power turbines. Pure hydrogen is an ideal fuel for chemical looping and because there is no flame which can produce $NO_x$, purified oxygen is not required.

EXAMPLES

Materials

Tris(2,2'-bipyridyl)dichlororuthenium(II) hexahydrate ([Ru(bpy)$_3$]$^{2+}$) was purchased from Aldrich.

Tris(2,2'-bipyridyl)perchlororuthenium (III) salt ([Ru(bpy)$_3$]$^{3+}$) was obtained by oxidation of Ru(bpy)$_3^{2+}$ with PbO$_2$ in 0.5 M H$_2$SO$_4$ and precipitated from solution by addition of concentrated HClO$_4$ (V. Y. Shafirovich, V. V. Strelets, *Bulletin of the Acadamen of Sciences of the USSR, Division of Chemical Sciences*, 1980, 7; V. Y. Shafirovich, N. K. Khannanov, V. V. Strelets, *Nouveau Journal de Chemie*, 1980, 4, 81). The product was dried under vacuum and stored in a freezer (−18° C.) in a sealed vial for not longer than 1-2 weeks.

Water for the preparation of solutions was obtained from a Barnstead Nanopure® water-purification system.

All other chemicals and salts were of the highest purity available from commercial sources.

Instrumentation

UV-Vis spectra were acquired on an Analytic Jena SPECORD S600 spectrophotometer equipped with a diode-array detector and an immersible fiber-optic probe.

Analysis of dioxygen in the reaction headspace was performed using a HP5890A model gas chromatograph equipped with a thermal conductivity detector and a GC column (1.5 m×3 mm) pack with 5 Å molecular sieves to separate O$_2$ and N$_2$. Argon was used as the carrier gas.

Example 1

Synthesis of Na$_{10}$[Co$_4$(H$_2$O)$_2$(α-PW$_9$O$_{34}$)$_2$] (Na-1)

Na$_{10}$[Co$_4$(H$_2$O)$_2$(α-PW$_9$O$_{34}$)$_2$] was prepared using a procedure for K$_{10}$[Co$_4$(H$_2$O)$_2$(□-PW$_9$O$_{34}$)$_2$] described in T. J. R. Weakley, H. T. Evans, J. S. Showell, G. F. Tourné, C. M. Tourné, *J Chem. Soc., Chem. Commun.*, 139 (1973).

Na$_2$WO$_4$.2H$_2$O (35.62 g, 0.108 mol), Na$_2$HPO$_4$.7H$_2$O (3.22 g, 0.012 mol), and Co(NO$_3$)$_2$.6H$_2$O (6.98 g, 0.024 mol) were mixed in 100 mL of water. After adjusting the pH from 9 to 7, the purple suspension was refluxed at 100° C. for two hours. A dark purple solution resulted within minutes of heating. The solution was saturated with NaCl and cooled to room temperature. The resulting purple crystals were collected, quickly washed with approximately 30 mL of water, and recrystallized from hot water (35% mass yield based on Co). Thermogravimetric analysis gave 27 water molecules of hydration.

FT/IR (cm$^{-1}$): 1037 (m), 939 (m), 882 (w), 767 (w).

UV-Vis (H$_2$O, pH 3.5 to 9): $\lambda_{max}$, 579 nm ($\epsilon_{579}$=330 M$^{-1}$ cm$^{-1}$). $^{31}$P-NMR: 1855 ppm, $\Delta_{v1/2}$=400 Hz;

Elemental analysis calculated (%) for Na$_{10}$[Co$_4$(H$_2$O)$_2$(PW$_9$O$_{34}$)$_2$].27H$_2$O: Co, 4.33; Na, 4.22; P, 1.14; W, 60.76. Found: Co, 4.49; Na, 4.24; P, 1.06; W, 58.7.

The following POMs were also prepared using procedures known in the art:

[Co$_4$(H$_2$O)$_2$(P$_2$W$_{15}$O$_{56}$)$_2$]$^{10-}$ (2);
[Co(H$_2$O)PW$_{11}$O$_{39}$]$^{5-}$ (3);
[Co(H$_2$O)SiW$_{11}$O$_{39}$]$^{6-}$ (4);
[Co$_3$(H$_2$O)$_3$(PW$_9$O$_{34}$)$_2$]$^{12-}$ (5);
[Co$_3$(H$_2$O)$_3$SiW$_9$O$_{37}$]$^{10-}$ (6);
[WCo$_3$(H$_2$O)$_2$(CoW$_9$O$_{34}$)$_2$]$^{12-}$ (7); and
[Co$_7$(H$_2$O)$_2$(OH)$_2$P$_2$W$_{25}$O$_{94}$]$^{16-}$ (8)

Example 2

Oxidation of Water Catalyzed by Cobalt Polyoxometalates in the Dark

A round-bottom flask with a total volume of ~17 mL was used to hold 8 mL of aqueous [Ru(bpy)$_3$]$^{3+}$ solution. A thick-wall tube was used to hold 2 mL of the catalyst in buffered solution. Both containers were capped with a rubber stopper and extensively deaerated by bubbling argon gas through the solution for over 10 minutes. The 2 mL solution in the thick-wall tube was then quickly transferred into the round-bottom flask using a cannula. This afforded 10 mL of reaction solution.

A fully deaerated 250 µL Hamilton gas-tight syringe was used to withdraw a sample of the gas from the reaction vessel headspace. Aliquots (100 µL) of this gas were immediately injected into a Hewlett-Packard 5890 gas chromatograph fitted with a thermal conductivity detector for analysis. For timed reactions, a stopwatch was used to measure the time elapsed from the time of solution transfer via cannula to the time at which gas was withdrawn from the headspace. TOF (turn over frequency) for 1 is given as the final TON divided by the time elapsed.

Calibration of this system was performed using the same procedures substituting the reaction solutions with water. Four reference volumes of O$_2$ were used in constructing a multipoint calibration slope. After mixing, 0 µL, 23.5 µL, 47 µL, or 70.5 µL of pure O$_2$ (corresponding to 0, 1, 2, or 3 µmol O$_2$) were injected into the headspace of the reaction vessel. The reaction vessel was shaken to allow equilibration of O$_2$ between gas and aqueous phases. The retention times of oxygen and nitrogen were separated by approximately 20 seconds. The oxygen peak was observed just under 1 minute. Contamination from air was minimal (<0.07 µmol O$_2$ for the chemical oxidation of water) and accounted for by subtracting half of the nitrogen peak area from the total oxygen peak area. This is a conservative estimate, as the gas chromatograph gives an oxygen to nitrogen ratio of 1:2.8 for a sample of air. The amount of O$_2$ was plotted against the integration area for the adjusted oxygen peak. A linear correlation between the two was found and the slope was used as the conversion factor for the quantification of $O_2$ yield in future experiments. Three data points were taken for each reference volume and the average $O_2$ peak area was used in the calibration, giving a Pearson r-value of >0.99.

Reactions were run at ambient temperature in 30 mM NaPi buffer with an initial pH 8.0 unless otherwise stated, and 1.5 mM $[Ru(bpy)_3]^{3+}$. TON=$n_{O2}/n_{catalyst}$;

$$O_2\text{-yield} = \frac{4n_{O_2}}{n_{Ru(bpy)_3}}.$$

The results are shown in Table 1.

TABLE 1

TON and $O_2$ yield for cobalt polyoxometalates

| Catalyst | Catalyst concentration (mM) | bpy (mM) | TON | $O_2$ yield (%) |
| --- | --- | --- | --- | --- |
| $[Co_4(H_2O)_2(PW_9O_{34})_2]^{10-}$ (1) | 0.0032 | 0.06 | 75 | 64 |
| $[Co_4(H_2O)_2(P_2W_{15}O_{56})_2]^{10-}$ (2) | 0.0064 | 0.06 | 0 | 0 |
| $[Co(H_2O)PW_{11}O_{39}]^{5-}$ (3) | 0.0064 | 0.06 | 0 | 0 |
| $[Co(H_2O)SiW_{11}O_{39}]^{6-}$ (4) | 0.0064 | 0.06 | 0 | 0 |
| $[Co_3(H_2O)_3(PW_9O_{34})_2]^{12-}$ (5) | 0.0064 | 0.06 | 0 | 0 |
| $[Co_3(H_2O)_3SiW_9O_{37}]^{10-}$ (6) | 0.0064 | 0.06 | 0 | 0 |
| $[WCo_3(H_2O)_2(CoW_9O_{34})_2]^{12-}$ (7) | 0.0064 | 0.06 | 0 | 0 |
| $[Co_7(H_2O)_2(OH)_2P_2W_{25}O_{94}]^{16-}$ (8) | 0.0064 | 0.06 | 0 | 0 |

Example 3

Effect of Bpy on Catalytic Water Oxidation Activity of 1 and Co(aq)$^{2+}$

Reactions were run at ambient temperature in 30 mM NaPi buffer, initial pH 8.0 unless otherwise stated, and 1.5 mM $[Ru(bpy)_3]^{3+}$. TON=$n_{O2}/n_{catalyst}$;

$$O_2\text{-yield} = \frac{4n_{O_2}}{n_{Ru(bpy)_3}}.$$

The results are shown in Table 2.

TABLE 2

TON and $O_2$ yield for cobalt catalysts

| Run | Catalyst | Catalyst concentration (mM) | bpy (mM) | Buffer | TON | $O_2$ yield (%) |
| --- | --- | --- | --- | --- | --- | --- |
| 1 | 1 | 0.0032 | 0 | pH 8 NaPi | 78.1 | 66.7 |
| 2 | 1 | 0.0032 | 0.3012 | pH 8 NaPi | 56 | 48 |
| 3 | Co(NO$_3$)$_2$ | 0.013[a] | 0.3012 | pH 8 NaPi | 0 | 0 |
| 4 | Co(NO$_3$)$_2$ | 0.060[b] | 0.3012 | pH 8 NaPi | 0.2 | <4 |
| 5 | Co(NO$_3$)$_2$ | 0.013 | 0 | pH 8 NaPi | 23.4 | 80 |
| 6 | no catalyst | — | 0 | pH 8 NaPi | 0 | 0 |
| 7 | 1 | 0.0032 | 0 | pH 6.2 NaPi/phthalic acid[c] | 0 | 0 |
| 8 | Co(NO$_3$)$_2$ | 0.013 | 0 | pH 6.2 NaPi/phthalic acid | 10 | 35 |
| 9 | 1 | 0.0032 | 0.135 | pH 8 NaPi | 70.3 | 60 |
| 10 | 1 (aged)[§] | 0.0032 | 0.135 | pH 8 NaPi | 71.2 | 60.8 |
| 11 | Co(NO$_3$)$_2$ (aged)[§] | 0.013 | 0 | pH 8 NaPi | 9.8 | 33.6 |
| 12 | CoO[d] | 0.0032 | 0 | pH 8 NaPi | 0 | 0 |

[a]Same theoretical cobalt concentration as 0.0032 mM 1;
[b]Same solid mass as 0.0032 mM 1;
[c]a mixed buffer of 30 mM NaPi and 30 mM phthalic acid at pH 6.2 was used;
[§]a 1 mM stock solution in 30 mM pH 8 NaPi was left for 72 hours before use;
[d]not soluble, suspension obtained after 10 minutes of sonication.

Example 4

Figure 2:
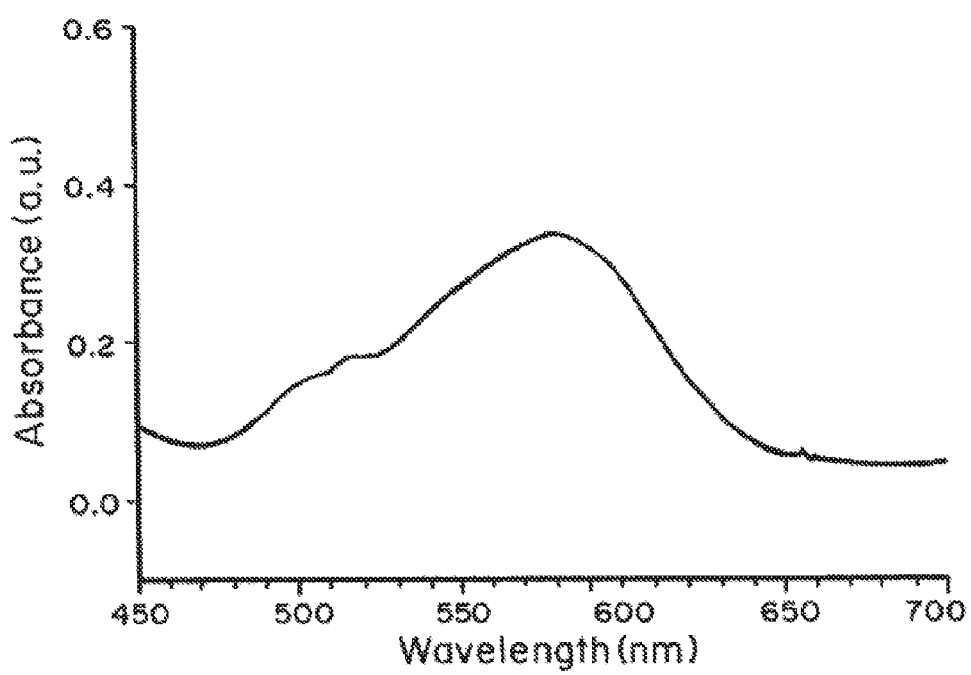
FIG. 2 is an ultraviolet-visible light (nm) absorption (absorption units) spectrum of [Co$_4$(H$_2$O)$_2$(PW$_9$O$_{34}$)$_2$]$^{10-}$ in 30 mM pH 8 sodium phosphate (NaPi) buffer.

Stability Studies of $[Co_4(H_2O)_2(PW_9O_{34})_2]^{10-}$ (a) UV/Vis spectroscopy of $[Co_4(H_2O)_2(PW_9O_{34})_2]^{10-}$. The stability of $[Co_4(H_2O)_2(PW_9O_{34})_2]^{10-}$ was evaluated over a period of one month using UV/Vis spectroscopy. A 1 mM solution of the catalyst was stored in 30 mM pH 8 NaPi buffer for one month. As shown in FIG. 2, the spectrum did not change with variation in solution age and solution pH (pH 3-9). The calculated extinction coefficient at $\lambda_{max}$ (579 nm) is $\epsilon_{579}$=330 $M^{-1}$ $cm^{-1}$.

Figure 3:
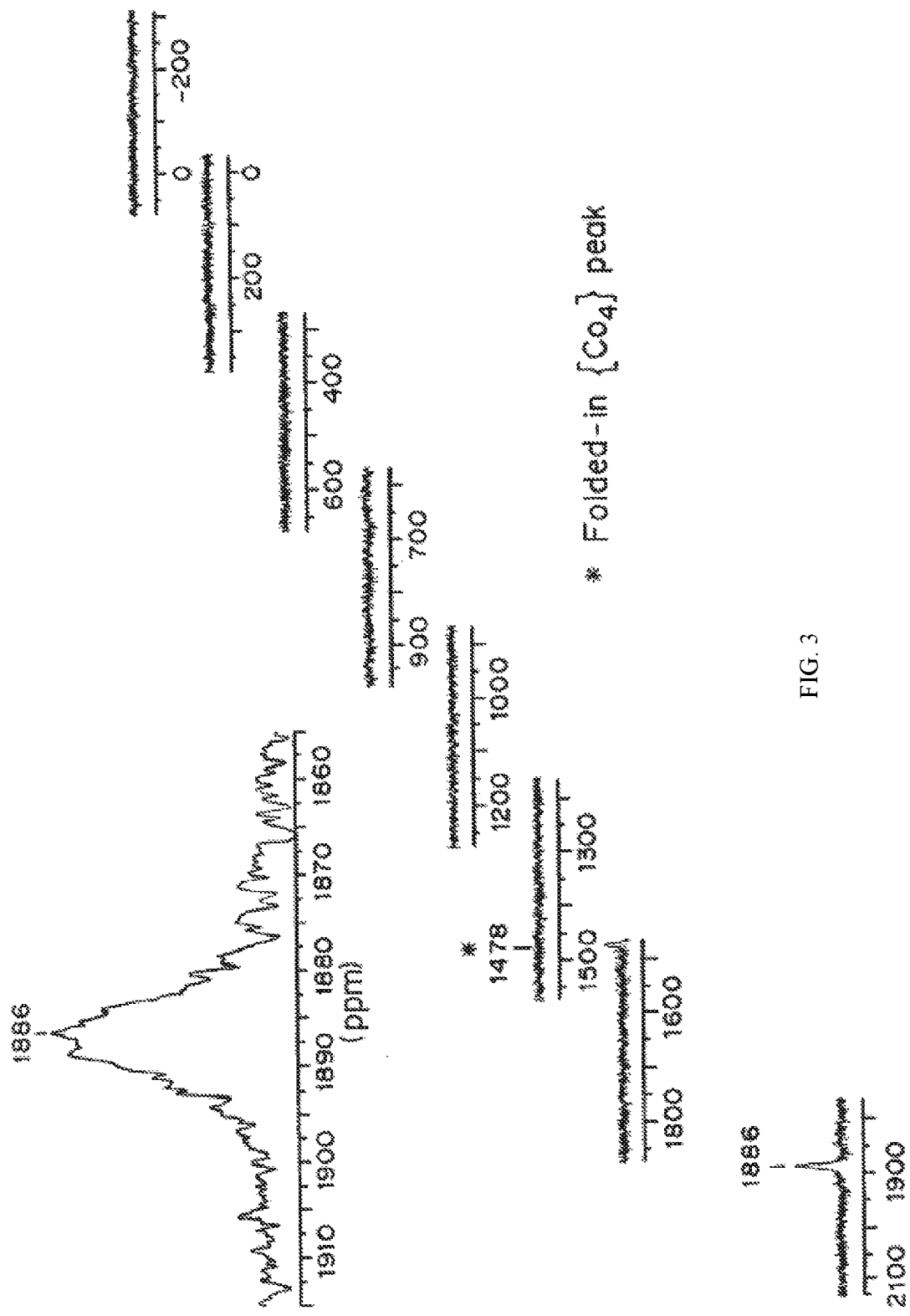
FIG. 3 is a $^{31}$P NMR spectrum of [Co$_4$(H$_2$O)$_2$(PW$_9$O$_{34}$)$_2$]$^{10-}$ at pH 3.5.

(b) $^{31}P$ NMR spectra of $[Co_4(H_2O)_2(PW_9O_{34})_2]^{10-}$. A 0.75 mM solution of $[Co_4(H_2O)_2(PW_9O_{34})_2]^{10-}$ was dissolved in $D_2O/H_2O$ sodium phosphate buffer (11 mM, pH 8) and aged for one month. The spectra were obtained at 300 K in 5 mm o.d. tubes on a Unity Plus 600 spectrometer equipped with a Varian 600 SW/PF6 probe head. The chemical shifts are given with respect to 85% $H_3PO_4$. The $^{31}P$ NMR spectra are shown in FIG. 3. $^{31}P$ NMR confirms that the catalyst remains structurally intact after one month in solution at pH 8.

(c) Post-oxidation concentration of $[Co_4(H_2O)_2(PW_9O_{34})_2]^{10-}$. $[Ru(bpy)_3]^{3+}$ (276.7 mg, 0.285 mmol) was dissolved in water (152 mL). A separate aqueous solution of 1 (0.016 mM in 0.153 M NaPi at pH 8.0, 38 mL) was then added. After the reaction was complete, the solution was concentrated via evaporation. When the solution volume was approximately 50-60 mL, $[Ru(bpy)_3]^{2+}$ (150 mg, 0.20 mmol) was added, inducing the formation of a yellow precipitate. The precipitate was collected by centrifugation and dried under vacuum (1.1 mg) before characterization by FT-IR and testing for water oxidation catalysis activity.

Figure 4:
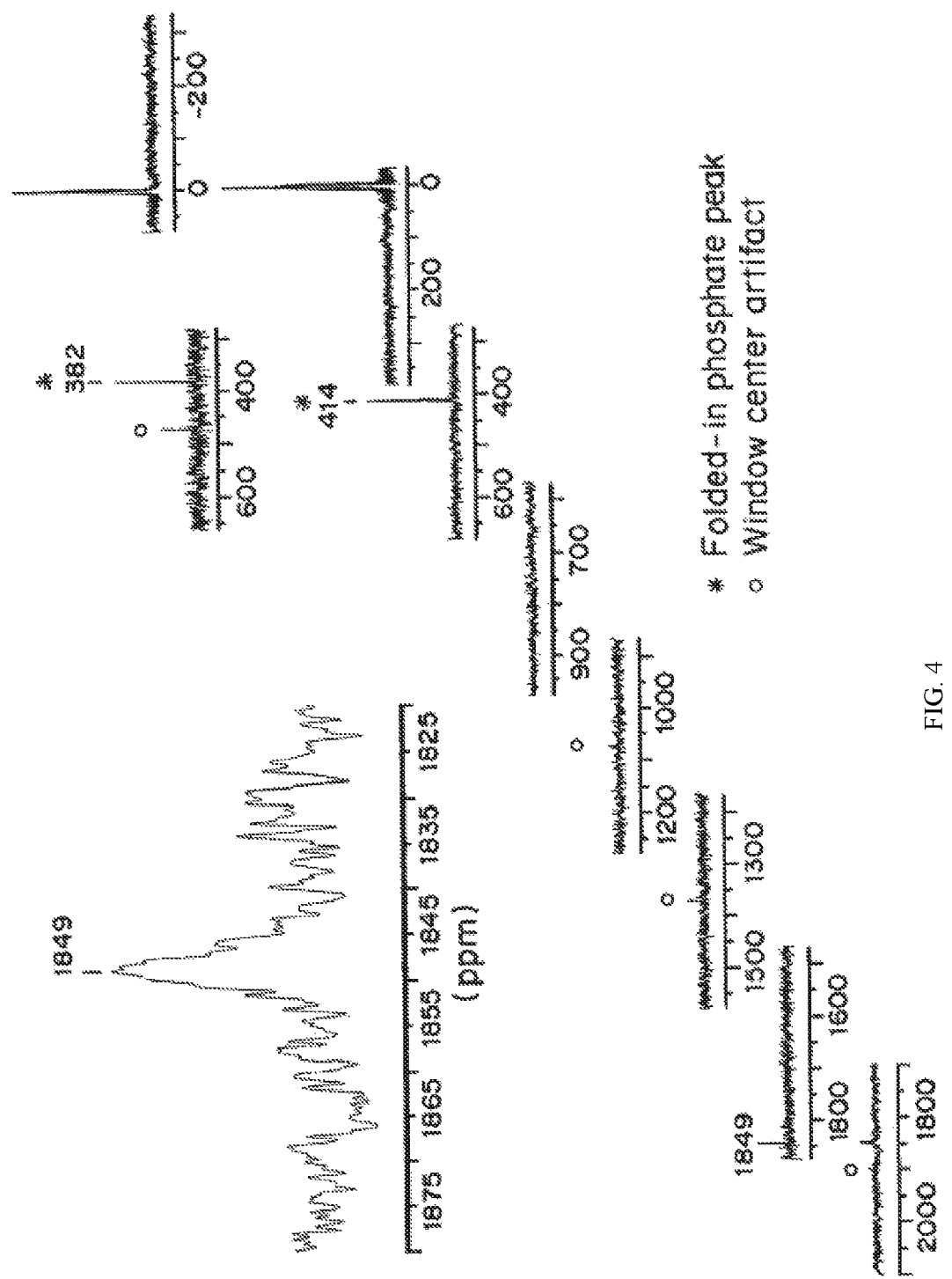
FIG. 4 is a $^{31}$P NMR spectrum of a post-catalysis solution of [Co$_4$(H$_2$O)$_2$(PW$_9$O$_{34}$)$_2$]$^{10-}$ after precipitation of [Ru(bpy)$_3$][BPh$_4$]$_2$.

Tris(2,2'-bipyridyl)triperchlororuthenium(III) ($[Ru(bpy)_3]^{3+}$, 11.0 mg, 11.3 µmol) was dissolved in $D_2O$ (15 mL). A separate solution containing 1 (0.075 mM) and NaPi (0.16 M, pH 8.0) was prepared in 1:5 $D_2O/H_2O$. A 2 mL aliquot of the latter solution was then added to 8 mL of the former solution, resulting in 0.6 mM $[Ru(bpy)_3]^{3+/2+}$, 0.015 mM 1, and 32 mM NaPi dissolved in 5:1 $D_2O/H_2O$. After the reaction was complete, Na(BPh$_4$) (18 mg, 52.6 □mol) was added. The resulting light yellow precipitate was obtained by filtration with a micro-filter. The colorless filtrate was used for $^{31}P$ NMR. The results are shown in FIG. 4. $^{31}P$ NMR showed only the presence of $Co_4(H_2O)_2(PW_9O_{34})_2]^{10-}$ in solution, indicating that the catalyst remains intact under catalytic water oxidation conditions.

Figure 5:
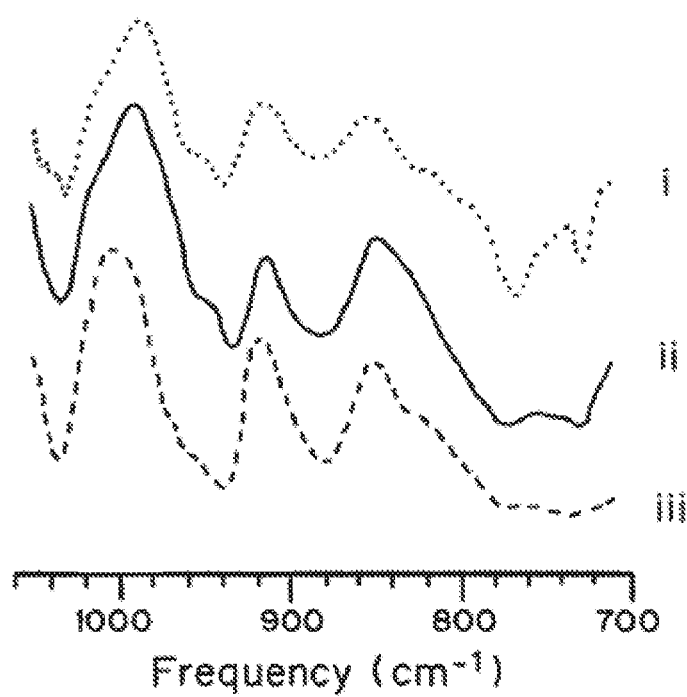
FIG. 5 is a infrared (IR) spectrum of Na$_{10}$[Co$_4$(H$_2$O)$_2$(PW$_9$O$_{34}$)$_2$] or Na$_{10}$-1 (iii), the precipitate re-isolated from a post-reaction solution of [Co$_4$(H$_2$O)$_2$(PW$_9$O$_{34}$)$_2$]$^{10-}$ (i), and the precipitate obtained from mixing concentrated solutions of Na$_{10}$-1 and [Ru(bpy)$_3$]$^{3+}$ (ii).

(d) Infrared Characterization of [Co$_4$(H$_2$O)$_2$(PW$_9$O$_{34}$)$_2$]$^{10-}$ after an initial catalytic run. The FT-Infrared spectrum is shown in FIG. 5. Na$_{10}$-1 (black), the light-yellow precipitate re-isolated from a "post-chemical reaction" solution (red), and the dark-yellow precipitate obtained from mixing two concentrated solutions of Na$_{10}$-1 and [Ru(bpy)$_3$]$^{2+}$ (blue). All FT-IR spectroscopy were performed using 1 wt % sample in KBr pellet. All three spectra show the characteristic P—O stretching (1037 cm$^{-1}$), terminal W—O stretching (939 cm$^{-1}$), and W—O—W bending (882 and 767 cm$^{-1}$) bands indicating that the POM framework remains intact after catalysis.

(e) Reuse of the catalyst after an initial catalytic run. The catalyst Na$_8$Ru(bpy)$_3$-1 (0.0032 mM) was used in the reaction of Ru(bpy)$^{3+}$ with water at pH 8 in NaPi as described in Example 2. The O$_2$ yield was 49.3% and the TON was 58 per 1, exactly reproducing the activity of pure and crystalline Na$_{10}$-1 (run #2, Table 2).

Figure 6A:
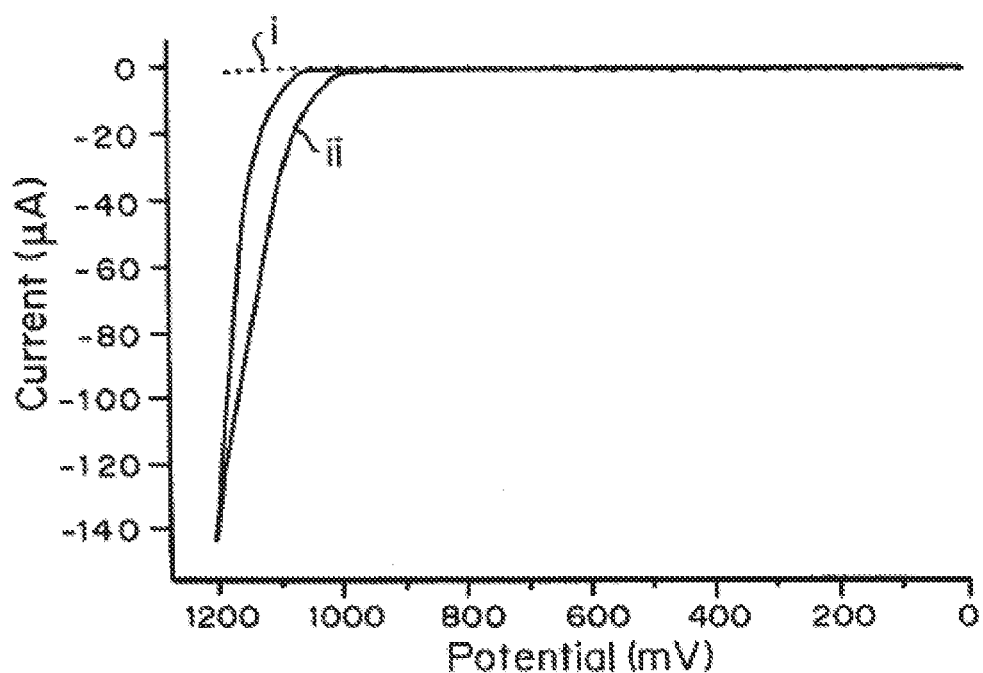
FIG. 6A is a cyclic voltammogram of 50 mM sodium solution (pH 8) in the absence of [Co$_4$(H$_2$O)$_2$(PW$_9$O$_{34}$)$_2$]$^{10-}$ (i) and containing 1 mM [Co$_4$(H$_2$O)$_2$(PW$_9$O$_{34}$)$_2$]$^{10-}$ (ii).
Figure 6B:
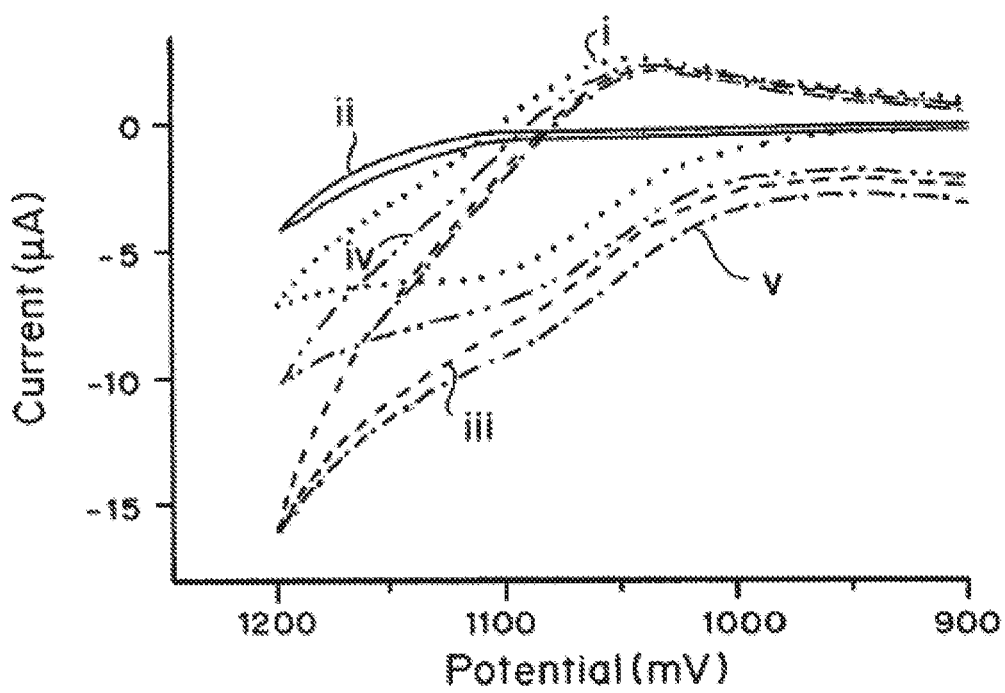
FIG. 6B is a cyclic voltammogram of 0.857 mM [Ru(bpy)$_3$]$^{2+}$ (i), 3.2 μM 1 (ii), a solution incapable of chemical water oxidation including 0.857 mM [Ru(bpy)$_3$]$^{2+}$ and 3.2 μM 1 (iii) or 1.6 μM 1 (iv), and a post-reaction solution containing 0.857 mM [Ru(bpy)$_3$]$^{3+}$ reduced in the presence of 3.2 μM 1 (v).

(f) Cyclic voltammetry of the catalyst after turnover. Cyclic voltammograms (CVs) were obtained at room temperature in buffered solutions using BAS CV-50W voltammetric analyzer. An Ag/AgCl (3 M NaCl) reference electrode from BAS was calibrated using the [Fe(CN)$_6$]$^{3-}$/[Fe(CN)$_6$]$^{4-}$ couple, for which accurate published data are available. On the basis of this calibration, potentials in the CV are reported relative to the NHE by the addition of 200 mV to the BAS electrode values. The results are shown in FIG. 6.

In the absence of [Co$_4$(H$_2$O)$_2$(PW$_9$O$_{34}$)$_2$]$^{10-}$, a conventional voltammogram is observed for the [Ru(bpy)$_3$]$^{3+}$/[Ru(bpy)$_3$]$^{2+}$ pair; however, upon addition of [Co$_4$(H$_2$O)$_2$(PW$_9$O$_{34}$)$_2$]$^{10-}$, an increased anodic current peak and decreased cathodic current peak is observed for this pair. This indicates the rapid reduction of [Ru(bpy)$_3$]$^{3+}$ by [Co$_4$(H$_2$O)$_2$(PW$_9$O$_{34}$)$_2$]$^{10-}$ followed by reduction of the oxidized [Co$_4$(H$_2$O)$_2$(PW$_9$O$_{34}$)$_2$]$^{10-}$ by water. The observed catalytic current increases with catalyst concentration. In addition, the current for two different [Ru(bpy)3]2+ samples is shown: the sample generated after catalytic chemical water oxidation (eq. 1; blue line) and the pure unreacted [Ru(bpy)$_3$]$^{2+}$ (green line). These two catalytic currents match, indicating no deactivation of catalyst and that the concentration of [Co$_4$(H$_2$O)$_2$(PW$_9$O$_{34}$)$_2$]$^{10-}$ remains constant after catalysis. In contrast, the same cyclic voltammetric experiment using Co(NO$_3$)$_2$ in place of [Co$_4$(H$_2$O)$_2$(PW$_9$O$_{34}$)$_2$]$^{10-}$ shows a marked decrease in the catalytic water oxidation current for the solution after chemical water oxidation when compared to that of an analogous solution containing unreacted [Ru(bpy)$_3$]$^{2+}$ and Co(NO$_3$)$_2$.

The cyclic voltammograms show that the catalyst is not deactivated after reaction and that the concentration of the catalyst remains constant after catalysis.

Example 5

Synthesis and Characterization of Rb$_8$K$_2$[{Ru$_4$O$_4$(OH)$_2$(H$_2$O)$_4$}(γ-SiW$_{10}$O$_{36}$)$_2$].25H$_2$O (9)

Potassium γ-decatungstosilicate, K$_8$[γ-SiW$_{10}$O$_{36}$].12H$_2$O was prepared according to the method of A. Tézé, G. Hervé, *Inorganic Synthesis*, Volume 27 (Ed.: A. P. Ginsburg), John Wiley and Sons, New York, 1990, pp. 85.

A solid sample of RuCl$_3$.H$_2$O (0.60 g, 2.67 mmol) was quickly added to a freshly prepared solution of K$_8$[γ-SiW$_{10}$O$_{36}$].12H$_2$O (4.00 g, 1.33 mmol) dissolved in 65 mL of H$_2$O. The solution immediately turned brown and the pH dropped to about 2.6. The solution pH was adjusted to 1.6 by drop-wise addition of 6 M HCl. After additional stirring for 5 minutes, a solution of RbCl (2.4 g, 20 mmol) dissolved in 10-15 mL of H$_2$O was added to the mixture in small portions. The mixture was filtered and the filtrate left to stand at room temperature. Brown plate crystals began to form after 24 h (1.8 g, 40% based on W).

Elemental analysis, calc'd, W: 55.14, Ru: 6.11, Si: 0.84, Rb: 10.14, K: 1.17. found, W: 55.2, Ru: 5.8, Si: 0.73, Rb: 10.2, K: 0.95.

The number of crystal water molecules was determined by thermogravimetric analysis (TGA).

IR (KBr pellet, 2000-400 cm$^{-1}$): 1616 (m), 999 (m), 947 (m-s), 914 (s), 874 (s), 802 (vs), 765 (vs), 690 (sh), 630 (sh), 572 (ms).

Raman (in H$_2$O, c=0.153 mM, $\lambda_c$=1064 nm): 1066 (w, br), 968 (w), 871 (w), 798 (w, br), 604 (w), 487 (s), 427 (s, br).

The infrared and Raman spectra are typical of □-substituted polytungstates and a characteristic Ru—O—Ru mode at 487 cm$^{-1}$ is evident in the latter spectrum. The Compound is EPR silent (X-band, RT, saturated aqueous solution).

Magnetic susceptibility measurements (2-290 K, 0.1, and 1.0 Tesla) showed as diamagnetic signal ($\lambda_{dia/TIP}$=−4.2× 10$^{-4}$ emu mol$^{-1}$. Electronic absorption spectra (400-900 nm, in H$_2$O (c=0.153 mM, 0.1 mm cell pathlength)) [$\lambda_{max}$, nm ($\epsilon$, M$^{-1}$ cm$^{-1}$)] is 445 at natural pH 4.9 and 445 (2.8×10$^4$) at pH 2.5.

Example 6

Oxidation of Water with Ruthenium-Containing Polyoxometalates in the Dark

Stock solutions of 1.5-2.5 mM [Ru(bpy)$_3$]$^{3+}$ were prepared in 1 mM HClO$_4$. The solution was diluted ~1:20 with water and the usual contamination with [Ru(bpy)$_3$]$^{2+}$ was estimated from its absorbance at 454 nm ($\epsilon$=1.45×104 M$^{-1}$ cm$^{-1}$). This [Ru(bpy)$_3$]$^{3+}$ solution was subsequently reduced by a slight excess of ascorbic acid and the total amount of [Ru(bpy)$_3$]$^{2+}$ was determined from the absorbance at 454 nm. The [Ru(bpy)$_3$]$^{2+}$ contamination in [Ru(bpy)$_3$]$^{3+}$ never exceeded 3-5%. A small amount (0.1-0.2 mL) of the [Ru(bpy)$_3$]$^{3+}$ was quickly mixed in a quartz UV-Vis cell filled with 2.8-2.9 mL of the catalyst solution in a phosphate buffer. The mixing time was 5-10 seconds and the data were collected every 3-10 seconds. Typically, the initial concentrations of [Ru(bpy)$_3$]$^{3+}$ were in the range of 0.09-0.12 mM.

Oxidation of water to O$_2$ was performed on a larger scale. The reaction vessel with a total volume of about 20 mL was filled with 8 mL of 1.5 mM [Ru(bpy)$_3$]$^{3+}$, sealed with a rubber septum, carefully deaerated, and filled with Ar gas. The second vessel was filled with a deaerated catalyst solution containing phosphate buffer. Then, 2.0 mL of the catalyst solution was withdrawn with a deaerated gas-tight syringe and injected into the first vessel. After 3-5 min, the headspace was analyzed for O$_2$ content: 0.1 mL of headspace gas was withdrawn through a septum by a deaerated gas-tight syringe and injected into the gas chromatograph. Contamination of the headspace by air was always quantified by measuring the N$_2$ present in the head-space (from N$_2$ peak on GC traces). The O$_2$ generated from catalytic H$_2$O oxidation was quantitatively corrected for the slight contamination of O$_2$ from air.

In a typical reaction, 1.2 mM (12 μmol) [Ru(bpy)$_3$]$^{3+}$ in the presence of 10 μM (0.1 μmol) of Rb$_8$K$_2$[{Ru$_4$O$_4$(OH)$_2$(H$_2$O)$_4$}(γ-SiW$_{10}$O$_{36}$)$_2$].25H$_2$O (Rb$_8$K$_2$-1(0)) gives 1.07 mM (10.7 μmol) [Ru(bpy)$_3$]$^{2+}$ (about 90% based on initial [Ru(bpy)$_3$]$^{3+}$) and 1.78 μmol of O$_2$ (about 66% based on initial [Ru(bpy)$_3$]$^{3+}$).

The turnover number for Rb$_8$K$_2$[{Ru$_4$O$_4$(OH)$_2$(H$_2$O)$_4$}(γ-SiW$_{10}$O$_{36}$)$_2$].25H$_2$O in the catalytic oxidation of H$_2$O is about 18 (moles O$_2$/moles (Rb$_8$K$_2$-1(0)) or 120 (moles O$_2$/moles Rb$_8$K$_2$-1(0)).

The hyperbolic relationship between catalyst concentration and oxygen yield is shown in Table 3.

TABLE 3

Effect of Catalyst, Oxidant Concentration, and Ionic Interaction on O$_2$ Yield and Turnover Number (TON) in the Oxidation of Water by [Ru(bpy)$_3$]$^{3+}$ catalyzed with Rb$_8$K$_2$-1(0)$^a$

| [Rb$_8$K$_2$-1(0)] | [Ru(bpy)$_3$]$^{3+}$, mM (μmol) | Buffer$^b$, (mM) | Other Reagents (mM) | O$_2$, (μmol)$^c$ | Y$^d$ (%) | TON$^e$ |
|---|---|---|---|---|---|---|
| 0 | 1.15 (9.1) | 20 | | <0.15 | <7 | |
| 1 | 1.15 (9.1) | 20 | | 0.73 | 32 | 91 |
| 2 | 1.15 (9.1) | 20 | | 1.14 | 50 | 73 |
| 5 | 1.15 (9.1) | 20 | | 1.57 | 69 | 39 |
| 8 | 1.15 (9.1) | 20 | | 1.70 | 75 | 30 |
| 2 | 0.6 (4.8) | 20 | | 0.78 | 65 | 49 |
| 2 | 2.3 (18.4) | 20 | | 0.82 | 18 | 51 |
| 2$^g$ | 1.15 (9.1) | 0 | | 1.48 | 65 | 92 |
| 5 | 1.15 (9.1) | 20 | 0.4, [Ru(bpy)$_3$]$^{2+}$ | 1.39 | 61 | 35 |
| 5 | 1.15 (9.1) | 20 | 0.8, [Ru(bpy)$_3$]$^{2+}$ | 1.28 | 56 | 32 |
| 2 | 1.15 (9.1) | 20 (Li) | | 1.23 | 54 | 76 |
| 2 | 1.15 (9.1) | 20 | 0.06, bpy | 1.23 | 54 | 76 |
| 2 | 1.15 (9.1) | 20 | 100, NaCl | 0.96 | 42 | 60 |
| 2 | 1.15 (9.1) | 20 (K) | 100, KCl | 0.59 | 26 | 37.5 |
| 1 | 1.15 (9.1) | 10 (Li) | 0.06, bpy | 0.75 | 33 | 92 |
| 0 | 1.15 (9.1) | 20 | 0.008, RuCl$_3$ | <0.25 | <11 | |

$^a$Conditions: total reaction volume: 8 mL, initial pH 7.2 (final pH 6.2-6.6), 24 ± 2° C.
$^b$Sodium phosphate unless indicated otherwise.
$^c$Typical experimental error ca. ±0.2 μM O$_2$.
$^d$Y = 4[O$_2$]/[[Ru(bpy)$_3$]$^{3+}$].
$^e$TON = nO$_2$/n1(0).
$^f$Reaction is complete in ~15 min.
$^g$Reaction is complete in ~75 min, final pH ~3.5.

Example 7

Figure 7A:
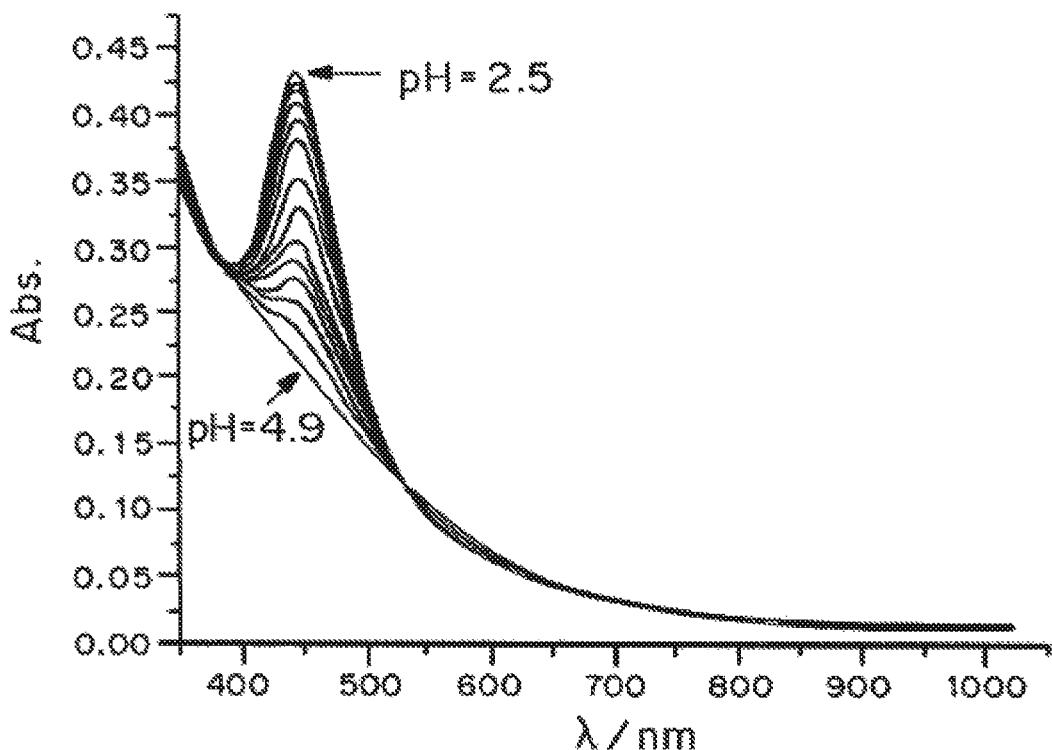
FIG. 7A is an ultraviolet-visible light absorption spectrum showing the absorption dependence of Rb$_8$K$_2$[{Ru$_4$O$_4$(OH)$_2$(H$_2$O)$_4$}(γ-SiW$_{10}$O$_{36}$)$_2$].25H$_2$O on pH and shows the change in absorption on decreasing the pH from 4.9 to 2.5.
Figure 7B:
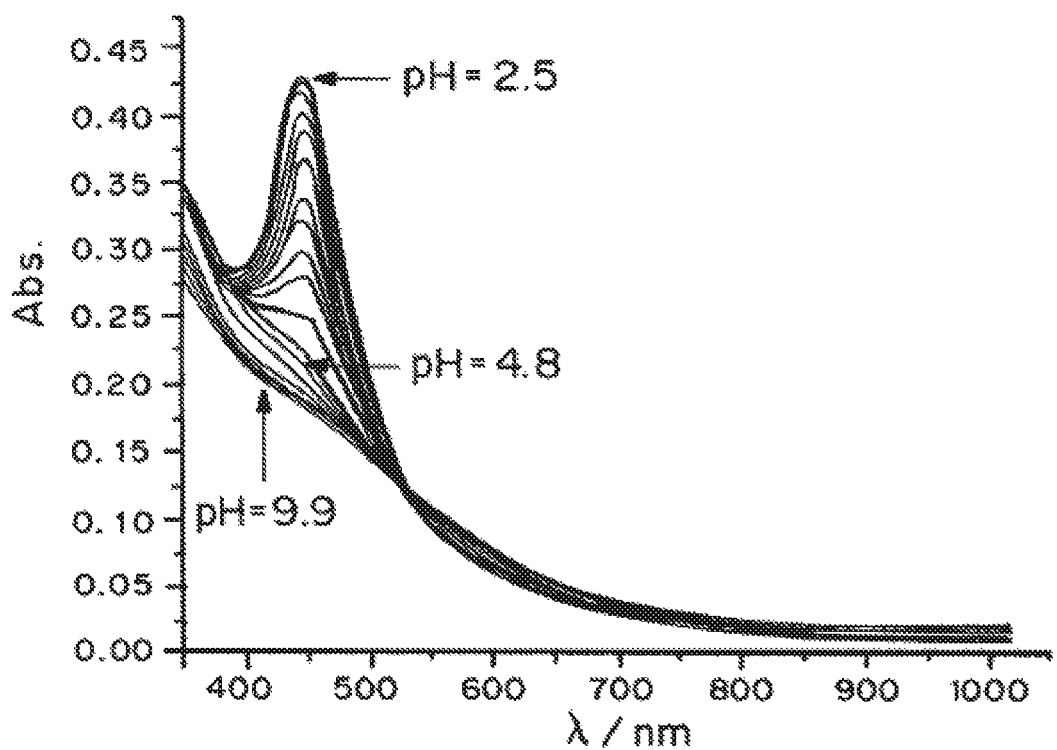
FIG. 7B is an ultraviolet-visible light absorption spectrum showing the absorption dependence of Rb$_8$K$_2$[{Ru$_4$O$_4$(OH)$_2$(H$_2$O)$_4$}(γ-SiW$_{10}$O$_{36}$)$_2$].25H$_2$O on pH and shows the change in absorption on increasing the pH from 4.9 to 9.9.

Stability of Rb$_8$K$_2$[{Ru$_4$O$_4$(OH)$_2$(H$_2$O)$_4$}(γ-SiW$_{10}$O$_{36}$)$_2$].25H$_2$O (a) Acid-base titrations are fully reversible up to pH 7.5. The pH titrations of UV-Vis spectra of Rb$_8$K$_2$[{Ru$_4$O$_4$(OH)$_2$(H$_2$O)$_4$}(γ-SiW$_{10}$O$_{36}$)$_2$].25H$_2$O were performed on a 0.15 mM solution (0.051 g of Rb$_8$K$_2$[{Ru$_4$O$_4$(OH)$_2$(H$_2$O)$_4$}(γ-SiW$_{10}$O$_{36}$)$_2$].25H$_2$O dissolved in 50 mL water) starting at pH 4.9 (the natural pH of the catalyst in water). The pH was lowered to 2.5 by drop-wise addition of 0.1 M HCl and then increased to 9.9 by dropwise addition of 0.1 M NaOH. The UV-Vis spectra are shown in FIG. 7.

Figure 8:
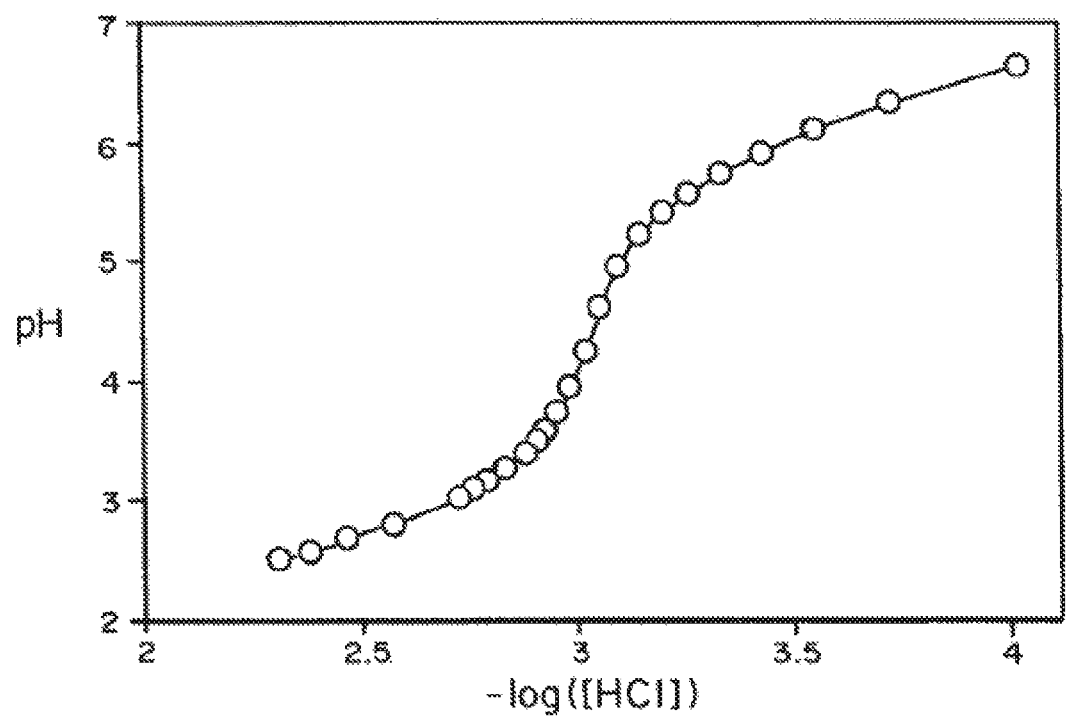
FIG. 8 is a titration curve of a 0.1 M HCl solution containing 2.8 μmol (18.7 mg) of Rb$_8$K$_2$[{Ru$_4$O$_4$(OH)$_2$(H$_2$O)$_4$}(γ-SiW$_{10}$O$_{36}$)$_2$].25H$_2$O. The initial volume is 4.5 ml. The initial pH is 4.2. The pH is raised to pH 7.5 by addition of 0.1 M NaOH.

Conventional (pH versus volume of titrant) acid-base titration of 2.8 μmol (18.7 mg) of Rb$_8$K$_2$[{Ru$_4$O$_4$(OH)$_2$(H$_2$O)$_4$}(γ-SiW$_{10}$O$_{36}$)$_2$].25H$_2$O was performed by adding 0.1 M HCl or 0.1 M NaOH. The initial solution volume was 4.5 mL and the initial pH was 4.2. The pH of the solution was then raised to 7.5 by adding 5.9 μmol NaOH (about 2.1 equiv per Rb$_8$K$_2$[{Ru$_4$O$_4$(OH)$_2$(H$_2$O)$_4$}(γ-SiW$_{10}$O$_{36}$)$_2$].25H$_2$O). Next, the solution was titrated with HCl. The titration curve is shown in FIG. 8.

Figure 9:
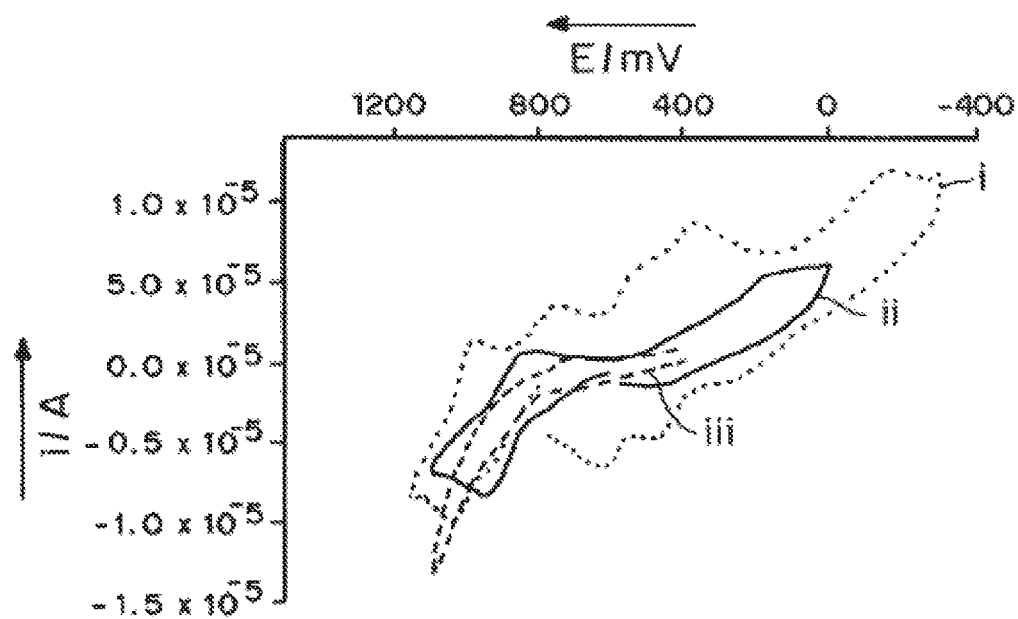
FIG. 9 is a cyclic voltammogram of 1 mM solution of Rb$_8$K$_2$[{Ru$_4$O$_4$(OH)$_2$(H$_2$O)$_4$}(γ-SiW$_{10}$O$_{36}$)$_2$].25H$_2$O in 0.1 M HCl (pH 1.0, i), 0.4 mM sodium acetate buffer (pH 4.7, ii); and 0.6 mM sodium acetate buffer (pH 7.0, iii).

(b) Cyclic voltammograms (CVs). Cyclic voltammograms were obtained at room temperature under Ar using 0.5-2 mM concentrations of Rb$_8$K$_2$[{Ru$_4$O$_4$(OH)$_2$(H$_2$O)$_4$}(γ-SiW$_{10}$O$_{36}$)$_2$].25H$_2$O in 0.1 M HCl and 0.4 M sodium acetate buffer (pH 4.8) or in 25 mM phosphate buffer (pH 7.0; 0.15 M NaCl was added to the phosphate buffer). Potentials are relative to Ag/AgCl (3.0 M NaCl). Scan rates were 25 and 100 mV s$^{-1}$. The results are shown in FIG. 9.

At pH 1.0, two oxidation peaks, ca. 940 and 1050 mV are observed in a scan from the rest potential (800 mV) to the positive potentials. The corresponding reduction peaks at ca. 750 mV and 965 mV are observed in the reverse scan. At lower potentials, three reduction peaks at 530 mV, 370 mV, and -170 mV and the corresponding re-oxidations at 640 mV, 480 mV, and 290 mV are observed.

At pH 7.0 there is a sharp increase in current at E>900 mV; a very weak peak at 930 mV is hardly seen. The current at 950-1050 mV are several-fold higher in the presence of 0.6 mM Rb$_8$K$_2$[{Ru$_4$O$_4$(OH)$_2$(H$_2$O)$_4$}(γ-SiW$_{10}$O$_{36}$)$_2$].25H$_2$O.

Figure 10:
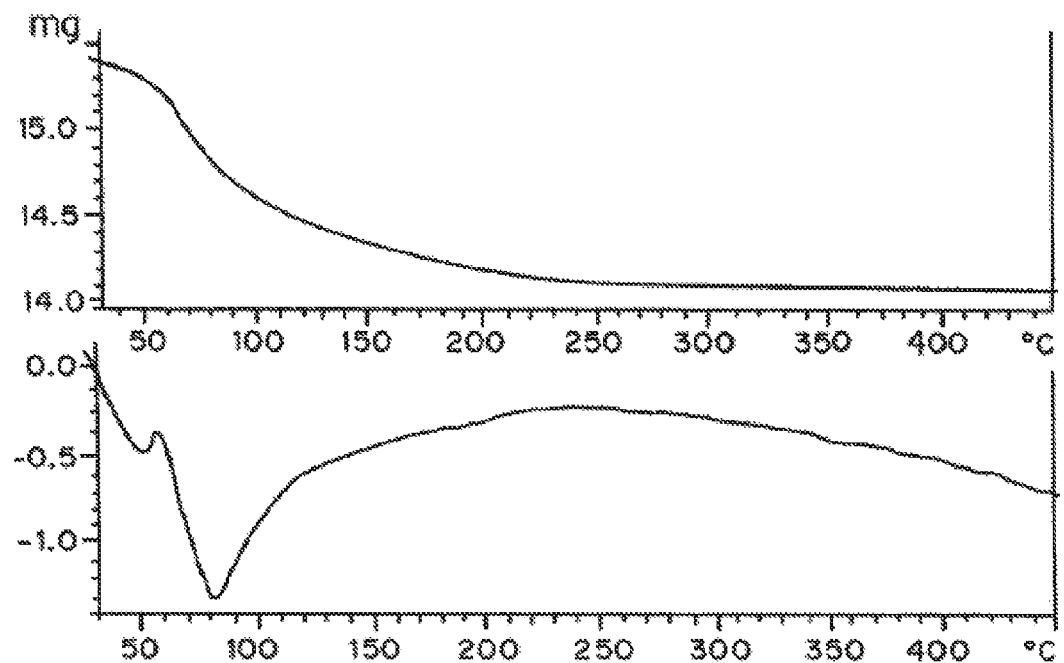
FIG. 10 is a thermogravimetric analysis scan (top graph) and a differential thermal analysis scan (bottom graph) of Rb$_8$K$_2$[{Ru$_4$O$_4$(OH)$_2$(H$_2$O)$_4$}(γ-SiW$_{10}$O$_{36}$)$_2$].25H$_2$O.

(c) Thermal stability. The thermal stability and decomposition characteristics of Rb$_8$K$_2$[{Ru$_4$O$_4$(OH)$_2$(H$_2$O)$_4$}(γ-SiW$_{10}$O$_{36}$)$_2$].25H$_2$O were assessed by thermogravimetric analysis (TGA) and differential thermal analysis (DTA). The results are shown in FIG. 10. The TGA curve shows a weight loss of 7.8% between 30 and 250° C. that is associated with the loss of 29 water molecules. The DTA curve shows an endothermic process between 50° C. and 130° C. attributed to desorption of water molecules of crystallization from the lattice structure.

Example 8

Synthesis of Cs$_9$[(γ-PW$_{10}$O$_{36}$)$_2$Ru$_4$O$_5$(OH)(H$_2$O)$_4$] (10)

Cs$_9$[(γ-PW$_{10}$O$_{36}$)$_2$Ru$_4$O$_5$(OH)(H$_2$O)$_4$] was prepared in 65% isolated yield by reacting a suspension of the poorly stable Cs$_7$[γ-PW$_{10}$O$_{36}$] with an acidic aqueous ruthenium trichloride solution (pH 0.6) in air. The cesium salt of the target product was collected by filtration. FT/IR (cm$^{-1}$): 1125, 1075, and 1043.

Example 9

Electrochemical Behavior of Cs$_9$[(γ-PW$_{10}$O$_{36}$)$_2$Ru$_4$O$_5$(OH)(H$_2$O)$_4$]

Figure 11:
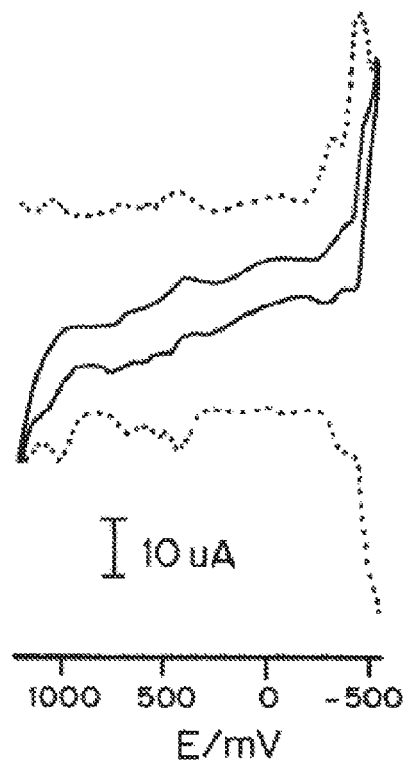
FIG. 11 is a cyclic voltammogram of a 1.2 mM solution of Cs$_9$[(γ-PW$_{10}$O$_{36}$)$_2$Ru$^{IV}_4$O$_5$(OH)(H$_2$O)$_4$] in 0.1 M sodium sulfate buffer containing 0.1 M sodium nitrate (pH 2.0). The scan rate was 25 mV/s and all potentials given are vs. Ag/AgCl (3 M NaCl) reference electrode. E=1029, 684, 563, 425, 98, −66, −346, and −480 mV.

The stability of Cs$_9$[(γ-PW$_{10}$O$_{36}$)$_2$Ru$_4$O$_5$(OH)(H$_2$O)$_4$] was evaluated using cyclic voltammetry. Cyclic voltammograms were obtained at room temperature at various pHs under argon using 1.2 mM concentrations of Cs$_9$[(γ-PW$_{10}$O$_{36}$)$_2$Ru$_4$O$_5$(OH)(H$_2$O)$_4$] in 0.1 M sodium sulfate buffer with 0.1 M sodium nitrate added, scan rate 25 mVs$^{-1}$. The results at pH 2.0 are shown in FIG. 11. The cyclic and differential pulse voltammograms display eight quasi-reversible waves. The first seven waves are attributed to ruthenium centered electron transfer, while the last (most negative) is likely tungsten centered. The linearity of the plot indicates that a quasi-continuum of energetic levels is accessible to the electrons and that the successive electron transfers are not coupled with proton transfers; the redox potentials are thus solely dependant on the total charge of the polyanion.

Example 10

Light-Driven Oxidation of Water with Cs$_9$[(□-PW$_{10}$O$_{36}$)$_2$Ru$_4$O$_5$(OH)(H$_2$O)$_4$]

Water oxidation was performed in a 15 mL Schlenk flask. The vessel was filled with 8 mL of a solution containing 1.0 mM [Ru(bpy)$_3$]Cl$_2$, 5 mM Na$_2$S$_2$O$_8$, 20 mM Na$_2$SiF$_6$ buffer at pH 5.81, and the desired concentration of catalyst. The solution was thoroughly deairated by purging with argon. The reaction was initiated by exposing the reaction vessel to the light of a Xe-lamp using 420-520 nm band-pass filters. After the desired illumination time, the reaction was temporarily stopped by blocking the light, and the flask was vigorously shaken to allow equilibration of O$_2$ between the solution and the head-space.

Figure 12:
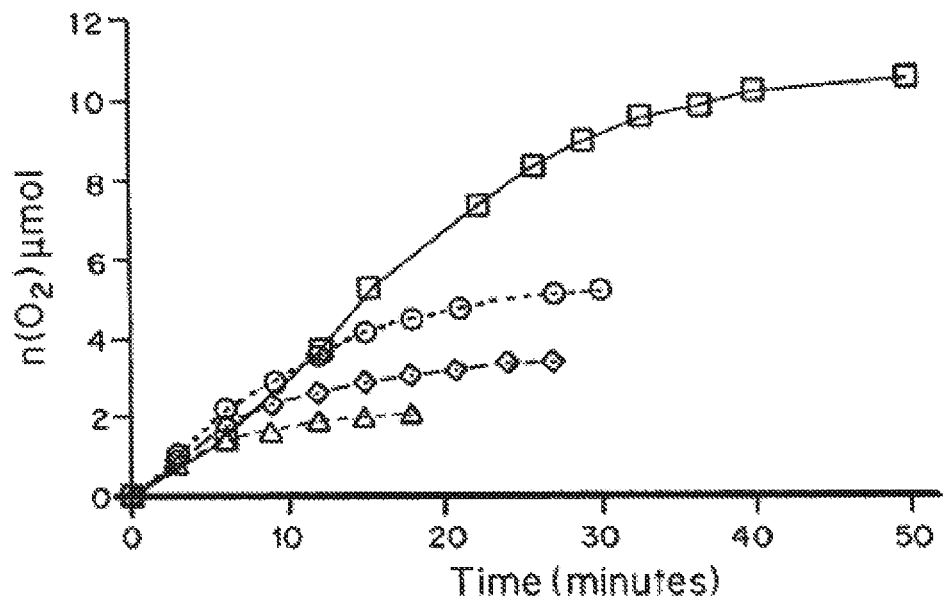
FIG. 12 is a graph showing the turn over number (TON) of oxygen (μmol) versus time (minutes) in a light driven oxidation of water in 5 mM Na$_2$S$_2$O$_8$ and 20 mM Na$_2$SiF$_6$, at a pH of 5.88 catalyzed by 5.0 μM [(γ-SiW$_{10}$O$_{36}$)$_2$Ru$^{IV}_4$O$_4$(OH)$_2$(H$_2$O)$_4$]$^{10-}$ (squares); 5.1 μM Cs$_9$[(γ-PW$_{10}$O$_{36}$)$_2$Ru$^{IV}$O$_5$(OH)(H$_2$O)$_4$] (circles); 3.9 μM [(γ-SiW$_{10}$O$_{36}$)$_2$Ru$^{IV}_4$O$_4$(OH)$_2$(H$_2$O)$_4$]$^{10-}$ (diamonds); and 2.6 μM Cs$_9$[(γ-PW$_{10}$O$_{36}$)$_2$Ru$^{IV}$O$_5$(OH)(H$_2$O)$_4$] (triangles).

Analysis of the headspace was performed by withdrawing a 0.1 mL sample from the headspace and injecting this into a gas chromatograph equipped with thermal conductivity detector and a GC column (1.5 m×3 mm; packed with 5 Å molecular sieves) to separate O$_2$ and N$_2$. Argon was used as the carrier gas. The amount of N$_2$ detected facilitated correction for the air contamination. At the end of the reaction, a sample of the solution was withdrawn, diluted in 0.1% aqueous ethanol and analyzed by UV-vis spectroscopy to determine the amount of [Ru(bpy)$_3$]$^{2+}$ remaining. The results are shown in FIG. 12.

Dioxygen forms with an initial turnover frequency reaching 0.13 s$^{-1}$. The total turnover number (TON)=n(O$_2$)/n(Cs$_9$[(γ-PW$_{10}$O$_{36}$)$_2$Ru$_4$O$_5$(OH)(H$_2$O)$_4$]) is up to 120. The oxygen yield, based on S$_2$O$_8^{2-}$, was 25% at a concentration of [Cs$_9$[(γ-PW$_{10}$O$_{36}$)$_2$Ru$_4$O$_5$(OH)(H$_2$O)$_4$] of 5.1 μM.

Example 11

Figure 13:
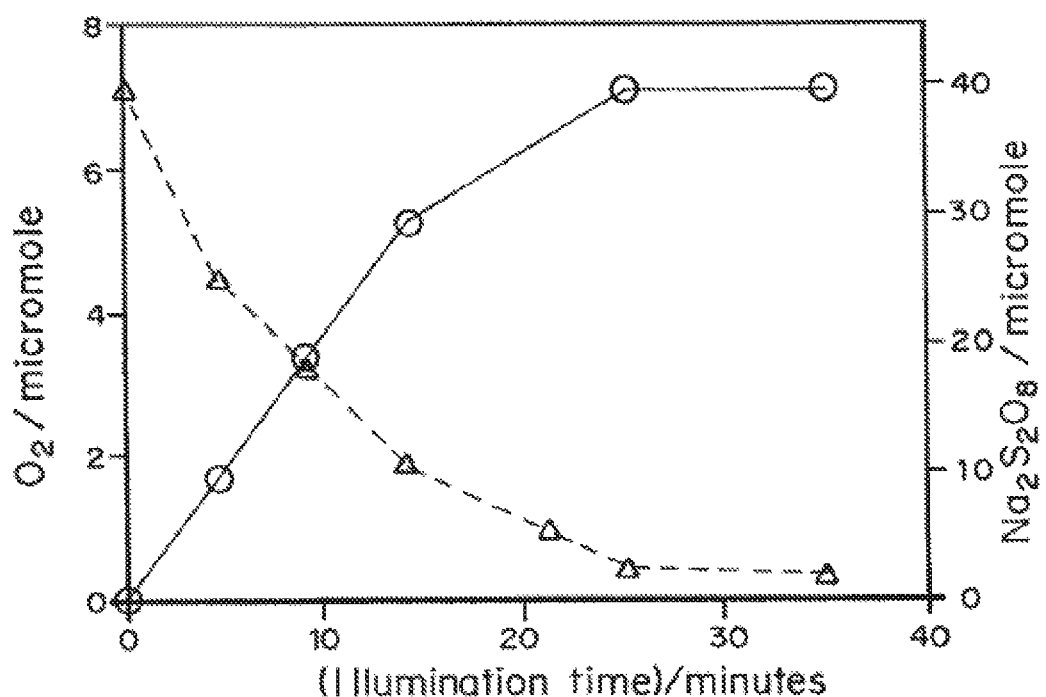
FIG. 13 is a graph showing the kinetics of O$_2$ formation (micromoles, open circles) and persulfate consumption (micromoles, open triangles) catalyzed by [{Ru$_4$O$_4$(OH)$_2$(H$_2$O)$_4$}(γ-SiW$_{10}$O$_{36}$)$_2$]$^{10-}$ as a function of illumination time (minutes).

Light-Driven Oxidation of Water with [(γ-SiW$_{10}$O$_{36}$)$_2$Ru$_4$O$_4$(OH)$_2$(H$_2$O)$_4$]$^{10-}$ Water oxidation was performed in a 15 mL Schlenk flask. The vessel was filled with 8 mL of a solution containing 1.0 mM [Ru(bpy)$_3$]Cl$_2$, 5.0 mM Na$_2$S$_2$O$_8$, 20 mM sodium phosphate (NaPi) buffer at pH 7.2, and 5.0 μM of the catalyst. The solution was thoroughly deairated by purging with argon. The reaction was initiated by exposing the reaction vessel to the light of a Xe-lamp using 420-520 nm band-pass filters. After the desired illumination time, the reaction was temporarily stopped by blocking the light, and the flask was vigorously shaken to allow equilibration of O$_2$ between the solution and the head-space. The results are shown in FIG. 13.

Dioxygen was formed quickly under visible light illumination (420-520 nm) while persulfate was consumed. A gradual decrease in pH from 7.2 to 6.3 and a gradual, <10-15%, decomposition of [Ru(bpy)$_3$]$^{2+}$ were also observed. The final dioxygen yield was approximately 38%. The TON was approximately 180 with an initial TOF of approximately 0.08 s$^{-1}$. Higher TONs (up to approximately 350) were achieved at lowed catalyst and higher persulfate concentrations.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A method of oxidizing water to oxygen, comprising mixing water with a photosensitizer, and a polyoxometalate water oxidation catalyst, under conditions such that oxygen is formed, wherein the catalyst is [Co$_4$(H$_2$O)$_2$(PW$_9$O$_{34}$)$_2$]$^{10}$ [A]$_{10}$ wherein A is a cation or combination of cations.

2. The method of claim 1, wherein mixing is done in the presence of an oxidizing agent.

3. The method of claim 1, wherein mixing is done in an electrochemical cell comprising an electrode.

4. The method of claim 3, wherein the electrochemical cell further comprises nanocrystalline TiO$_2$.

5. The method of claim 1, wherein the photosensitizer is a ruthenium complex.

* * * * *

UNITED STATES PATENT AND TRADEMARK OFFICE
CERTIFICATE OF CORRECTION

| | |
|---|---|
| PATENT NO. | : 9,833,777 B2 |
| APPLICATION NO. | : 14/338384 |
| DATED | : December 5, 2017 |
| INVENTOR(S) | : Craig L. Hill |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this
Seventh Day of February, 2023

Katherine Kelly Vidal
*Director of the United States Patent and Trademark Office*